(12) United States Patent
Chen et al.

(10) Patent No.: US 12,223,271 B2
(45) Date of Patent: Feb. 11, 2025

(54) TEXT PROCESSING METHOD, DEVICE AND STORAGE MEDIUM

(71) Applicant: Beijing Baidu Netcom Science Technology Co., Ltd., Beijing (CN)

(72) Inventors: Zeyu Chen, Beijing (CN); Haifeng Wang, Beijing (CN); Tian Wu, Beijing (CN); Dianhai Yu, Beijing (CN); Yanjun Ma, Beijing (CN); Xiaoguang Hu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 287 days.

(21) Appl. No.: 17/874,394

(22) Filed: Jul. 27, 2022

(65) Prior Publication Data

US 2023/0186024 A1    Jun. 15, 2023

(30) Foreign Application Priority Data

Dec. 10, 2021  (CN) .......................... 202111505371.1

(51) Int. Cl.
*G06F 40/10*    (2020.01)
*G06F 40/284*   (2020.01)
*G06F 40/47*    (2020.01)

(52) U.S. Cl.
CPC ............ *G06F 40/284* (2020.01); *G06F 40/47* (2020.01)

(58) Field of Classification Search
CPC ........... G06F 40/10; G06F 40/30; G06F 40/56
See application file for complete search history.

(56) References Cited

U.S. PATENT DOCUMENTS

| 6,327,702 B1 | 12/2001 | Sauntry et al. |
| 11,610,054 B1* | 3/2023 | Aggarwal ............... G06F 40/30 |
| 2009/0106017 A1* | 4/2009 | D'Agostini ............. G06F 40/58 |
| | | 704/3 |
| 2011/0043652 A1* | 2/2011 | King ..................... G06F 40/194 |
| | | 707/706 |
| 2017/0278510 A1 | 9/2017 | Zhao et al. |

(Continued)

FOREIGN PATENT DOCUMENTS

| CN | 109446534 A | 3/2019 |
| CN | 110287378 A | 9/2019 |
| CN | 112861548 A | 5/2021 |

(Continued)

OTHER PUBLICATIONS

Oct. 11, 2023—(JP) Notice of Refusal—App. No. JP2022-124589.

(Continued)

*Primary Examiner* — Daniel Abebe
(74) *Attorney, Agent, or Firm* — Banner & Witcoff, Ltd.

(57) ABSTRACT

Provided are a text processing method, a device and a storage medium, relating to a field of computer technology, and especially to a field of artificial intelligence, such as natural language processing and deep learning. The specific implementation scheme includes: performing text processing on first text, by using a text processing acceleration operator; and processing, in parallel and faster, content after the text processing, by using the text processing acceleration operator. Text processing and parallel acceleration are carried out by the text processing acceleration operator, which can improve the speed of text processing.

26 Claims, 19 Drawing Sheets

(56) References Cited

U.S. PATENT DOCUMENTS

2023/0114742 A1* 4/2023 Aggarwal ............... G06F 40/30
715/235

FOREIGN PATENT DOCUMENTS

| CN | 113010181 A | 6/2021 |
|---|---|---|
| CN | 113031966 A | 6/2021 |
| CN | 113504906 A | 10/2021 |
| CN | 113535144 A | 10/2021 |

OTHER PUBLICATIONS

Aug. 1, 2022—(CN) First Office Action and Search Report—App. No. CN2021115053711.
Apr. 14, 2023—(EP) European Extended Search Report—App. No. EP22188472.9.
Making deployment simple and fast: FasterERNIE for optimizing the entire process of pre trained models, https://aistudio.baidu.com/aistudio/projectdetail/3200308; pp. 19, visited Jul. 12, 2022.
Shao Dangguo et al., Domain-Specific Chinese Word Segmentation Based on Bi-Directional Long-Short Term Memory Model, IEEEAccess, vol. 7, 2019, pp. 10.
Toan Dinh Nguyen et al., Text Line Segmentation in Handwritten Document Images Using Tensor Voting, IEICE Trans. Fundamentals, vol. E94-A, No. Nov. 11, 2011, pp. 8.

* cited by examiner

TEXT PROCESSING METHOD, DEVICE AND STORAGE MEDIUM

CROSS-REFERENCE TO RELATED APPLICATIONS

The present application claims the priority from Chinese Patent Application No. 202111505371.1, filed with the Chinese Patent Office on Dec. 10, 2021, the content of which is hereby incorporated herein by reference in its entirety.

TECHNICAL FIELD

The present disclosure relates to a field of computer technology, and in particular, to a field of artificial intelligence, such as natural language processing and deep learning.

BACKGROUND

Natural Language Processing (NLP) is one of the application scenarios of the deep learning framework. With the rapid popularization of pre-training model technology, the paradigms of the two mission-critical applications that are natural language understanding and generating are gradually unified, and the requirements of developers and business scenarios for its performance and ease of use are also gradually improved.

SUMMARY

The present disclosure provides a text processing method and apparatus, a system, a device and a storage medium.

According to one aspect of the present disclosure, provided is a text processing method, including: performing text processing on first text, by using a text processing acceleration operator; and processing, in parallel and faster, content after the text processing, by using the text processing acceleration operator.

According to another aspect of the present disclosure, provided is a text processing apparatus, including: a text processing module configured to perform text processing on first text, by using a text processing acceleration operator; and a parallel acceleration module configured to process, in parallel and faster, content after the text processing, by using the text processing acceleration operator.

According to another aspect of the present disclosure, provided is a system based on a deep learning framework, including: a text processing acceleration operator configured to perform text processing on first text and process, in parallel and faster, content after the text processing.

According to another aspect of the present disclosure, provided is an electronic device, including: at least one processor; and a memory connected in communication with the at least one processor. The memory stores an instruction executable by the at least one processor, and the instruction, when executed by the at least one processor, enables the at least one processor to execute the method of any embodiment of the present disclosure.

According to another aspect of the present disclosure, provided is a non-transitory computer-readable storage medium storing a computer instruction thereon, and the computer instruction is used to cause a computer to execute the method of any embodiment of the present disclosure.

According to another aspect of the present disclosure, provided is a computer program product including a computer program, and the computer program implements the method of any embodiment of the present disclosure, when executed by a processor.

It should be understood that the content described in this part is not intended to identify key or important features of embodiments of the present disclosure, nor is it used to limit the scope of the present disclosure. Other features of the present disclosure will be easily understood by the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope and spirit of the present disclosure. Likewise, for clarity and conciseness, descriptions of well-known functions and structures are omitted in the following descriptions.

Figure 1:
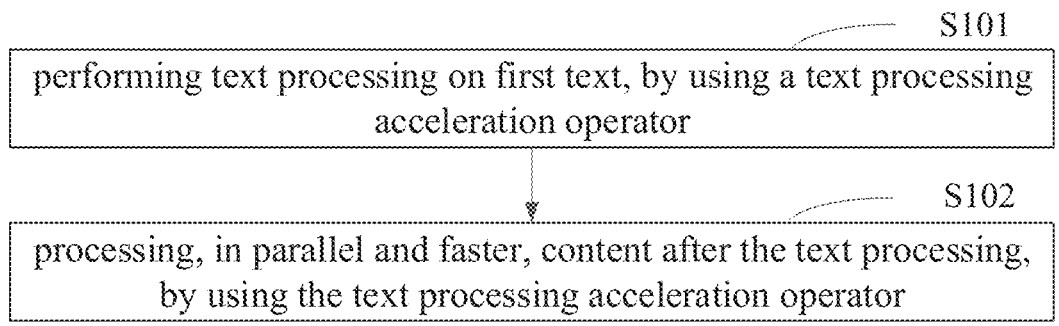
FIG. 1 is a schematic flowchart of a text processing method according to an embodiment of the present disclosure.

FIG. 1 is a schematic flowchart of a text processing method according to an embodiment of the present disclosure. The method may include the followings.

In S101, text processing is performed on first text, by using a text processing acceleration operator.

In S102, the content after the text processing is processed, in parallel and faster, by using the text processing acceleration operator.

Specifically, the first text may include specific content that needs to continue to be processed, such as one or more string texts. The text acceleration processing operator, such as a Faster Tokenizer Operator, may perform a series of text processing on a plurality of string texts, to obtain content of integer format corresponding to each string text. Then, the text processing acceleration operator may further process, in parallel and faster, the content that is in the integer format and obtained after the text processing. In this way, text processing and parallel acceleration are carried out by the text processing acceleration operator, which can improve the speed of text processing.

Figure 2:
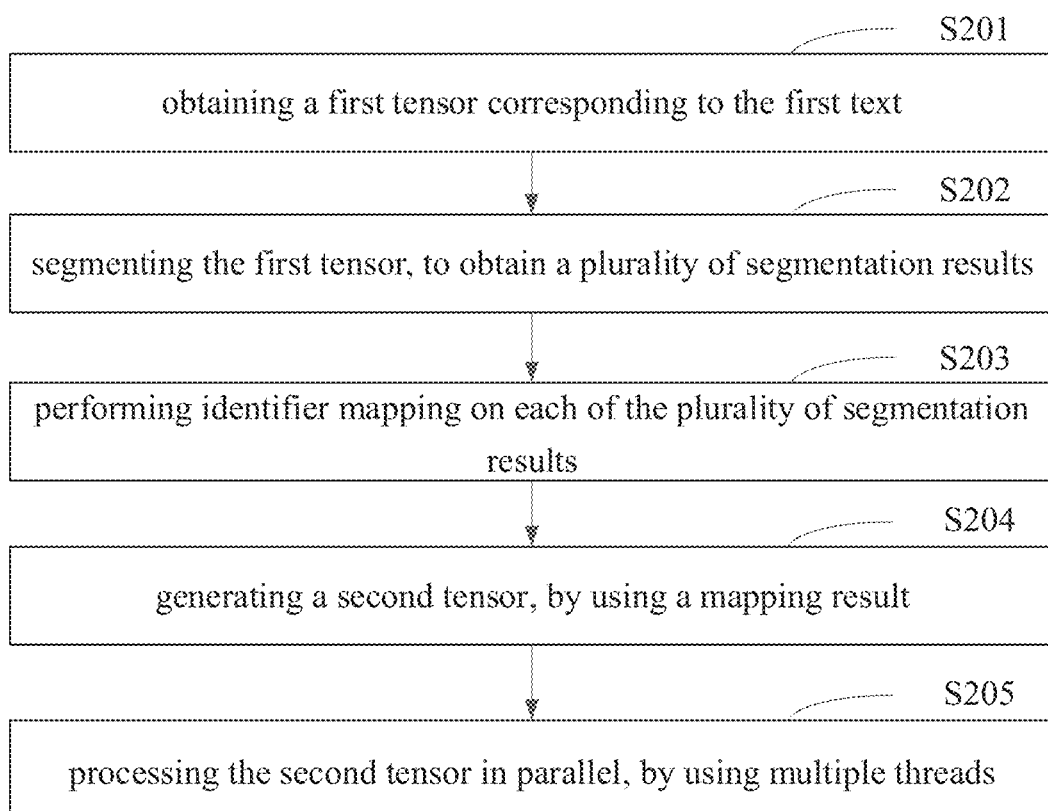
FIG. 2 is a schematic flowchart of a text processing method according to another embodiment of the present disclosure.

FIG. 2 is a schematic flowchart of a text processing method according to another embodiment of the present disclosure. The text processing method of this embodiment may include one or more features of the above method embodiments. In one implementation, the performing of the text processing on the first text, by using the text processing acceleration operator, in S101 includes the followings.

In S201, a first tensor corresponding to the first text is obtained.

In S202, the first tensor is segmented, to obtain a plurality of segmentation results.

In S203, identifier mapping is performed on each of the plurality of segmentation results.

In S204, a second tensor is generated, by using the mapping result.

Illustratively, a tensor expression of the first text may be obtained by using a first tensor operator, to convert the first text into the first tensor. A tensor is a data structure in a neural network, which can be understood as a data container and is similar to a multidimensional array or a matrix. The first tensor may include a string tensor, and the string tensor may include the one or more string texts (which may be referred to as strings, for short) in the first text. For example, the first tensor may include N lines of string divided from the first text. The first tensor may be segmented by a segmenting operator, which may include segmenting the string in the first tensor. Then, after the segmentation results being mapped separately by using a mapping operator, the second tensor may be obtained according to the mapping result, by using a second tensor operator. The second tensor may include N lines of numeric value of integer format corresponding to the N lines of string. In the embodiments of the present disclosure, the text can be orderly arranged through the first tensor, which is conducive to improving the accuracy of the processing result, and the processing speed can be improved through the operationalization of the text processing.

In one implementation, the segmenting of the first tensor, to obtain the plurality of segmentation results, in S202, includes at least one of: performing word segmentation processing on the first tensor, to obtain a plurality of segmented words; and performing term segmentation processing on the first tensor, to obtain a plurality of segmented terms.

For example, the word segmentation processing is performed on a string of "今天空气不错" in the first tensor, by using a word segmenting operator, and a plurality of segmented words of "今", "天", "空", "气", "不" and "错" of this string are obtained.

For another example, the word segmentation processing is performed on a string of "let's go and get some fresh air" in the first tensor, by using a word segmenting operator, and a plurality of segmented words of "let", "us", "go", "and", "get", "some", "fresh" and "air" of this string are obtained.

For another example, the term segmentation processing is performed on a string of "一起去旅游" in the first tensor, by using a term segmenting operator, and a plurality of segmented terms of "一起", "去" and "旅游" of this string are obtained.

For another example, the term segmentation processing is performed on a string of "let's go shopping together" in the first tensor, by using a term segmenting operator, and a plurality of segmented terms of "let's", "go shopping" and "together" of this string are obtained.

In the embodiments of the present disclosure, it can be determined to specifically perform the word segmentation processing, the term segmentation processing, or both the word segmentation processing and the term segmentation processing, according to the requirements of actual application scenario, which will not be limited. In the embodiments of the present disclosure, the performing of the word segmentation processing and/or the term segmentation processing on the first tensor, is conducive to flexibly adapting to more text processing scenarios.

In one implementation, the performing of the identifier mapping on each of the plurality of segmentation results, in S203, includes: mapping each segmented word and/or each segmented term to a numerical value, according to a mapping relationship. For example, a dictionary, a thesaurus, or a word-list, etc. may be preset as the mapping relationship, and each corresponding numeric value of integer format may be found in the dictionary, the thesaurus, or the wordlist, etc. In the embodiments of the present disclosure, the numeric value corresponding to each segmented word and/or each segmented term of the first tensor can be found through the mapping relationship, which is more convenient for machine processing and conducive to improving the processing speed and accuracy.

In one implementation, in S204, the generating of the second tensor by using the mapping result includes: obtaining each line of numeric value of the second tensor, according to a result of mapping of a corresponding line of string of the first tensor. The first tensor includes N lines of string, the second tensor includes N lines of numeric value corresponding to the N lines of string, and N is a positive integer.

For example, if the first tensor includes N lines of string, a numeric value corresponding to each line of string may be found according to the above mapping relationship, so as to obtain the N lines of numeric value. A matrix composed of the N lines of numeric value may be used as the second tensor. In the embodiments of the present disclosure, the numeric values converted from the first text can be arranged in order through the second tensor, which is convenient for subsequent accelerated processing.

In one implementation, the first text includes a string, and the first tensor is a string tensor. The second tensor is an integer tensor, and each line of numeric value of the second tensor uniquely corresponds to one line of string of the first tensor. In the embodiments of the present disclosure, the strings can be arranged in order through the first tensor, and the integer numeric values converted from the strings can be arranged in order through the second tensor, which is convenient for subsequent accelerated processing.

In one implementation, the processing of the content after the text processing, in parallel and faster, by using the text processing acceleration operator, in S102, includes the followings.

In S205, the second tensor is processed in parallel, by using multiple threads. For example, the multiple threads are called by using a multithreading parallel acceleration operator, and if each thread is able to process one line of numeric value of the second tensor, the plurality of lines of numeric value of the second tensor may be processed in parallel. In the embodiments of the present disclosure, the text processing speed can be significantly improved through multithreading, which is conducive to the realization of high-performance character encoding/decoding. Generally, the more threads that can be called at the same time, the faster the parallel processing speed.

In one implementation, the text processing is transformed from being executed in a first language into being executed in a second language. In the embodiments of the present disclosure, that transform the text processing from being executed in the first language into being executed in the second language, is able to utilize multithreading parallel acceleration, and is conducive to flexibly adapting to different language environments and further improving the processing speed.

In one implementation, the first language is an interpreted language and the second language is a compiled language. For example, the process of the text processing that is originally executed by running the interpreted language is transformed into being executed by running the compiled language, and the parallel acceleration is realized by utilizing the feature that the compiled language is able to call the multiple threads. Specifically, for example, the interpreted language may include python, Java, etc., and the compiled language may include C++. The interpreted language and the compiled language may also include languages of other types other than the above examples, which are not limited here. In this way, it is conducive to flexibly adapting to different language environments, reducing the difficulty of development, and improving the processing speed by utilizing the compiled language.

Figure 3:
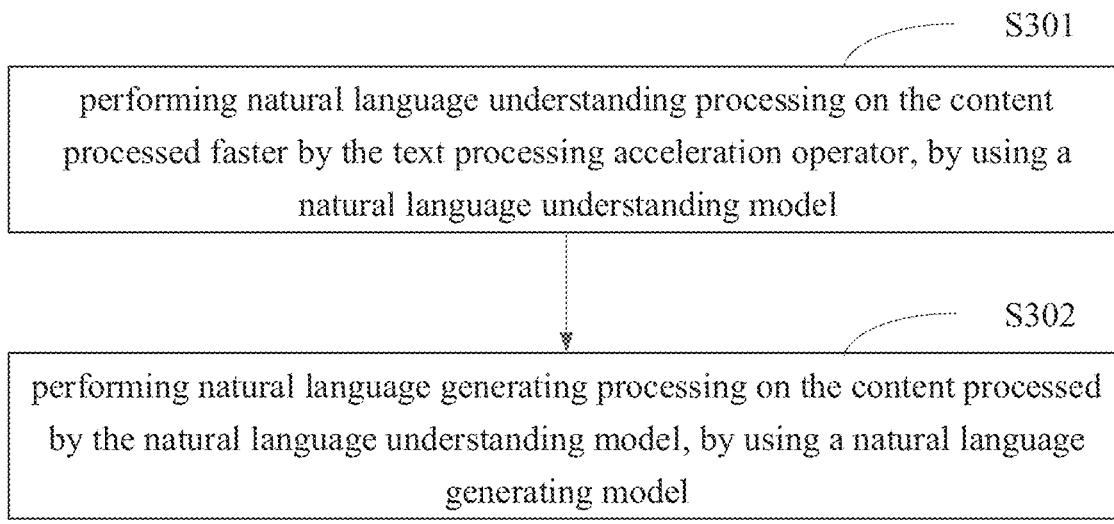
FIG. 3 is a schematic flowchart of a text processing method according to another embodiment of the present disclosure.

FIG. 3 is a schematic flowchart of a text processing method according to another embodiment of the present disclosure. The text processing method of this embodiment may include one or more features of the above method embodiments. In one implementation, the method further includes the followings.

In S301, natural language understanding processing is performed on the content processed faster by the text processing acceleration operator, by using a natural language understanding model. In the embodiments of the present disclosure, applying the text processing acceleration operator to the natural language understanding model can speed up the processing of natural language understanding.

In one implementation, the natural language understanding model includes the text processing acceleration operator and a transformer encoder operator. In this embodiment, the specific functions of the text processing acceleration operator can be referred to related descriptions in the embodiments of FIG. 1 and FIG. 2. For example, after the multithreading parallel acceleration operator in the text processing acceleration operator reading numeric values from the second tensor in parallel, the multithreading parallel acceleration operator delivers the numeric values to the transformer encoder operator, and the transformer encoder operator encodes the received numeric values as a string. The transformer encoder operator may include a multilayer transformer encoder. In the embodiments of the present disclosure, the natural language understanding processing can be carried out quickly and accurately through the text processing acceleration operator and the transformer encoder operator.

In one implementation, the transformer encoder operator includes a Fused Attention operator and a Fused Feed forward operator.

For example, the Fused Attention operator is able to reduce the quantity of operators (OP) of the attention. Specifically, for example, the quantity of the General Matrix-matrix Multiplication (GEMM), the bias add and the transpose in the Multi-Head Attention may be reduced from 3 to 1, the data reuse rate may be improved, and then the Fused Attention operator is obtained.

For another example, kernels, such as the FusedDropoutActBias, the FusedLnAddDropoutBias, the FusedAddDropoutBias, etc., may be fused to obtain the Fused Feed forward operator.

In the embodiments of the present disclosure, the framework scheduling overhead can be reduced through the Fused Attention operator, and the memory access overhead can be reduced through the Fused Feed forward operator.

In one implementation, the method further includes the followings.

In S302, natural language generating processing is performed on the content processed by the natural language understanding model, by using a natural language generating model. For example, after the transformer encoder operator of the natural language generating model outputting a natural language understanding result, the natural language generating model may decode and predict the natural language generating model, by using a decoder, to obtain a natural language generating result. In the embodiments of the present disclosure, the generating result can be accurately predicted based on the natural language understanding result, through the natural language generating model.

In one implementation, the natural language generating model includes a transformer decoder operator and a decoding strategy operator. In the embodiments of the present disclosure, the natural language generating model can quickly and accurately perform the natural language generating processing, through the transformer decoder operator and the decoding strategy operator.

In one implementation, the performing of the natural language generating processing on the content processed by the natural language understanding model, by using the natural language generating model, in S302, includes: identifying a characteristic of a decoder code, by using the transformer decoder operator, to identify an adopted generation network type; and calling a preset decoding operator corresponding to the generation network type.

For example, a high-performance decoding operator may be preset for each generation network type. If a user selects a certain type of decoder code, the transformer decoder operator may identify the generation network type adopted by the user based on the decoder code. Then, the transformer decoder operator may call a preset high-performance decoding operator corresponding to the identified generation network type. Therefore, in the embodiments of the present disclosure, a variety of generation network types can be supported, thereby supporting more decoding capabilities.

In one implementation, the generation network type includes at least one of: a Decoder type, a Prefix Language Model (Prefix LM) type, or an Encoder-Decoder type.

For example, a generation network of the Decoder type may include a decoder layer, and a transformer layer, etc. For another example, a generation network of the Prefix LM type may include a Prefix LM layer, and a transformer layer, etc. For yet another example, a generation network of the Encoder-Decoder type may include a decoder layer, a transformer layer, an encoder-decoder layer, and an encoder layer, etc. In the embodiments of the present disclosure, richer decoding capabilities are provided by supporting more comprehensive generation network types.

In one implementation, the performing of the natural language generating processing on the content processed by the natural language understanding model, by using the natural language generating model, in S302, further includes: identifying a characteristic of a decoding strategy, by using the decoding strategy operator, to identify an adopted decoding algorithm; and automatically translating a cyclic code running in a first language into a code of a second language, by using the decoding algorithm.

For example, if the user selects a decoding algorithm, the decoding strategy operator may identify a characteristic of a decoding strategy, and then identify an encryption algorithm adopted by the user, and then the cyclic code in the first language is automatically translated into the code in the second language. Referring to the above examples, the first language may be an interpreted language and the second language may be a compiled language. By using the identified decoding algorithm, the cyclic code running in the interpreted language can be automatically translated into the code of the compiled language. Therefore, it is conducive to automatic code conversion between different languages, and thus the performance of the natural language generating processing is improved, and the difficulty of development is reduced.

In one implementation, the decoding algorithm includes at least one of: a search-based decoding algorithm, or a sampling-based decoding algorithm.

For example, the search-based decoding algorithm may include a greedy search, a beam search, etc. The greedy search may predict the most likely word in each step and take this word as the input for the next prediction. The beam search may use a given syntax sentence inputted to the encoder/decoder, to output the most likely probability value of the first word firstly; and then consider what the second word is for each first possible word that has been selected.

For another example, the sampling-based decoding algorithm may include random sampling, Top-K Sampling, and Top-P (nucleus) Sampling. The random sampling may include: performing random sampling, according to a probability distribution of a next word on the entire word-list obtained by a language model, so as to determine what the next word will be generated. The Top-K Sampling may include: obtaining K words with the highest probability, and then sampling after normalizing the probability of these K words. The Top-P sampling may include: accumulating the probabilities of the current words, from large to small; and in response to the accumulated value being greater than a threshold P, discarding a subsequent word having a small probability, and resampling the preceding word.

In the embodiments of the present disclosure, through different decoding algorithms, more abundant automatic decoding functions can be supported, and the performance of code conversion can be improved.

In one implementation, the performing of the natural language generating processing on the content processed by the natural language understanding model, by using the natural language generating model, in S302, further includes: compiling the code of the second language, by calling a Just In-time Compiler ability of a deep learning framework, to obtain a dynamic link library, so as to link the dynamic link library with the deep learning framework.

Referring to the examples above, the second language may be a compiled language. By calling the Just In-time Compiler capability of the deep learning framework, the code of the compiled language can be automatically compiled to obtain the dynamic link library, so as to link the deep learning framework with the dynamic link library to obtain the high-performance transformer decoder operator.

Figure 4:
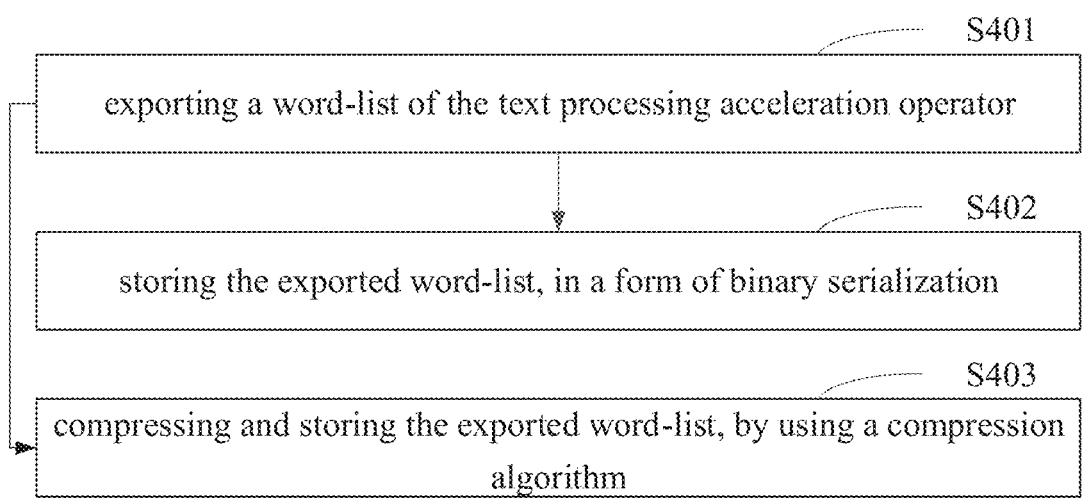
FIG. 4 is a schematic flowchart of a text processing method according to another embodiment of the present disclosure.

FIG. 4 is a schematic flowchart of a text processing method according to another embodiment of the present disclosure. The text processing method of this embodiment may include one or more features of the above method embodiments. In one implementation, the method further includes the followings.

In S401, a word-list of the text processing acceleration operator is exported. For example, the word-list of the text processing acceleration operator may include the mapping relationship between each word and a numeric value used by the text processing acceleration operator. The word-lists of text processing acceleration operators used by different natural language understanding models may be different, or partially or completely the same, which is determined according to the specific functions of the natural language understanding models. In the embodiments of the present disclosure, the word-list of the text processing acceleration operator can be reused after being exported, which is conducive to improving the speed of the subsequent deployment and reducing the deployment difficulty.

In one implementation, the method further includes at least one of the followings.

In S402, the exported word-list is stored, in a form of binary serialization.

In S403, the exported word-list is compressed and stored, by using a compression algorithm.

Serialization storage helps to improve the speed of the reading of the word-list, and then improve the speed of text processing. Compressed storage can reduce the storage space occupied by the word-list and save storage resources.

Figure 5:
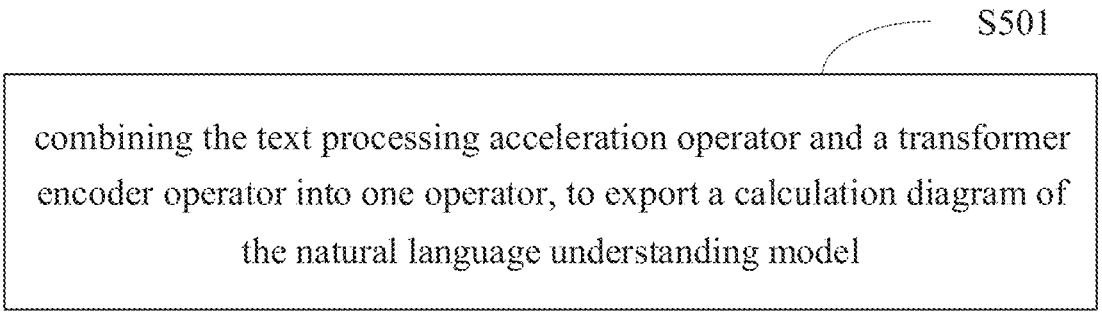
FIG. 5 is a schematic flowchart of a text processing method according to another embodiment of the present disclosure.

FIG. 5 is a schematic flowchart of a text processing method according to another embodiment of the present disclosure. The text processing method of this embodiment may include one or more features of the above method embodiments. In one implementation, the method further includes the followings.

In S501, the text processing acceleration operator and a transformer encoder operator are combined into one operator, to export a calculation diagram of the natural language understanding model.

In the embodiments of the present disclosure, the calculation diagram may be a directed diagram, and a node therein may correspond to a mathematical operation. The calculation diagram may be a way to express and evaluate a mathematical expression. In the embodiments of the present disclosure, the combining of the text processing acceleration operator and the transformer encoder operator into the calculation diagram of the natural language understanding model is conducive to accelerating the speed of natural language understanding and obtaining accurate natural language understanding results.

Figure 6:
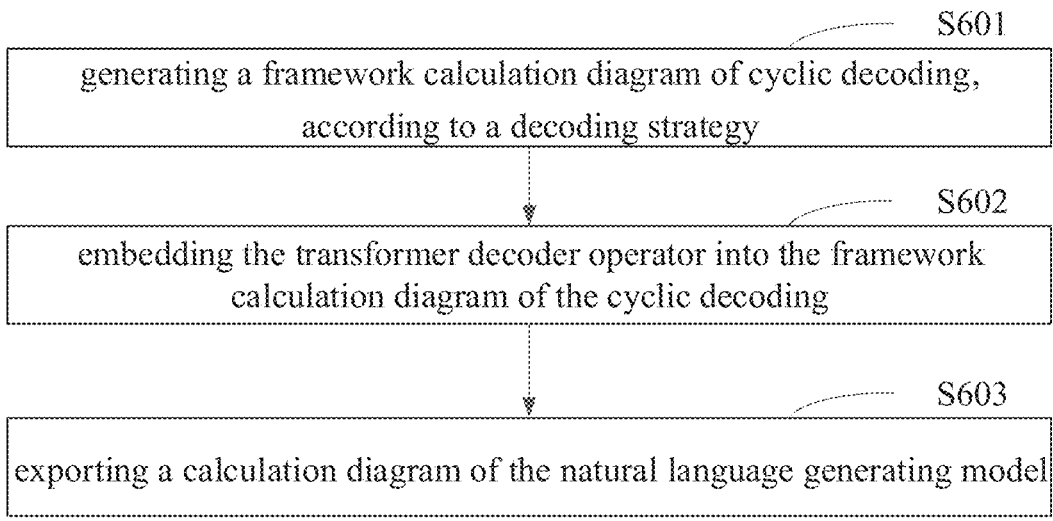
FIG. 6 is a schematic flowchart of a text processing method according to another embodiment of the present disclosure.

FIG. 6 is a schematic flowchart of a text processing method according to another embodiment of the present disclosure. The text processing method of this embodiment may include one or more features of the above method embodiments. In one implementation, the method further includes the followings.

In S601, a framework calculation diagram of cyclic decoding is generated, according to a decoding strategy.

In S602, the transformer decoder operator is embedded into the framework calculation diagram of the cyclic decoding.

In S603, a calculation diagram of the natural language generating model is exported.

For example, the framework calculation diagram of the cyclic decoding (which can be referred to as a decoding framework calculation diagram for short) is generated firstly according to the decoding strategy. The decoding framework calculation diagram mainly includes a cyclic flow diagram. Then, a calculation structure of the decoder is added to the decoding framework calculation diagram. For example, the calculation structure of the decoder may include a generation network structure obtained by identifying the characteristic of the decoder code by using the transformer decoder operator.

In the embodiments of the present disclosure, by embedding the transformer decoder operator into the decoding framework calculation diagram, the calculation diagram of the natural language generating model can be exported quickly, which is conducive to the reducing of the difficulty of the subsequent deployment and the improving of the deployment speed.

In one implementation, the method further includes: exporting a combined calculation diagram of natural language processing, the combined calculation diagram of the natural language processing including a calculation diagram combined by the calculation diagram of the natural language understanding model and the calculation diagram of the natural language generating model. The calculation diagram of the natural language understanding model includes the text processing acceleration operator and a transformer encoder operator. The calculation diagram of the natural language generating model includes the transformer decoder operator and the decoding strategy operator. The combined calculation diagram may include an operator of the calculation diagram of the natural language understanding model and an operator of the calculation diagram of the natural language generating model.

In the embodiments of the present disclosure, the integrated storage can be realized by exporting the combined calculation diagram, and the export method is simple. Further, the exported calculation diagram supports rich natural language understanding and generating functions.

In one implementation, the method further includes: importing, at least one of the calculation diagram of the natural language understanding model, the calculation diagram of the natural language generating model, or the combined calculation diagram, into a deep learning framework of a plurality of devices. In this way, it is conducive to the realizing of one-time export and deployment-in-multiplace, so as to satisfy the requirements of the plurality of devices for integration of training and reasoning and unified deployment.

Figure 7:
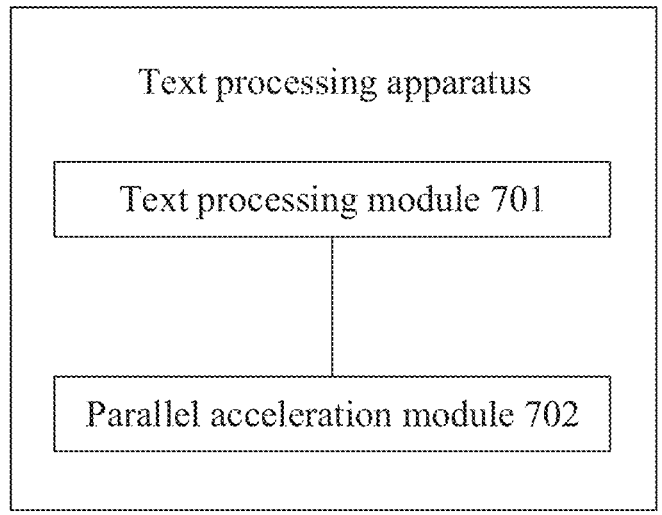
FIG. 7 is a structural schematic diagram of a text processing apparatus according to an embodiment of the present disclosure.

FIG. 7 is a structural schematic diagram of a text processing apparatus according to an embodiment of the present disclosure. The device includes: a text processing module 701 configured to perform text processing on first text, by using a text processing acceleration operator; and a parallel acceleration module 702 configured to process, in parallel and faster, content after the text processing, by using the text processing acceleration operator.

In the embodiments of the present disclosure, text processing and parallel acceleration are carried out by the text processing acceleration operator, which can improve the speed of text processing.

Figure 8:
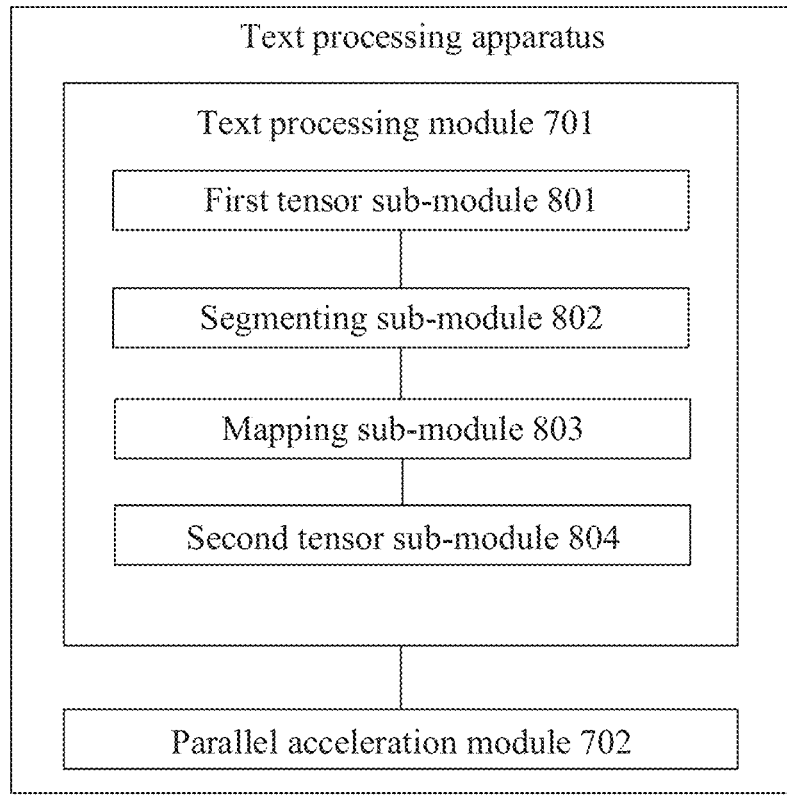
FIG. 8 is a structural schematic diagram of a text processing apparatus according to another embodiment of the present disclosure.

FIG. 8 is a structural schematic diagram of a text processing apparatus according to another embodiment of the present disclosure. The text processing apparatus of this embodiment may include one or more features of the above apparatus embodiments. In one implementation, the text processing module 701 includes the followings.

A first tensor sub-module 801 is configured to obtain a first tensor corresponding to the first text.

A segmenting sub-module 802 is configured to segment the first tensor, to obtain a plurality of segmentation results.

A mapping sub-module 803 is configured to perform identifier mapping on each of the plurality of segmentation results.

A second tensor sub-module 804 is configured to generate a second tensor, by using a mapping result.

In one implementation, the segmenting sub-module 802 is specifically configured to perform at least one of: performing word segmentation processing on the first tensor, to obtain a plurality of segmented words; and performing term segmentation processing on the first tensor, to obtain a plurality of segmented terms.

In one implementation, the mapping sub-module 803 is specifically configured to map each segmented word and/or segmented term into a numerical value, according to a mapping relationship.

In one implementation, the second tensor sub-module 804 is specifically configured to obtain each line of numeric value of the second tensor, according to a result of mapping of a corresponding line of string of the first tensor. The first tensor includes N lines of string, the second tensor includes N lines of numeric value corresponding to the N lines of string, and N is a positive integer.

In one implementation, the first text includes a string, and the first tensor is a string tensor. The second tensor is an integer tensor, and each line of numeric value of the second tensor uniquely corresponds to one line of string of the first tensor.

In one implementation, the parallel acceleration module 702 is specifically configured to process, in parallel, the second tensor, by using multiple threads.

In one implementation, that the text processing module 701 performs the text processing is transformed from running in a first language into running in a second language.

Figure 9:
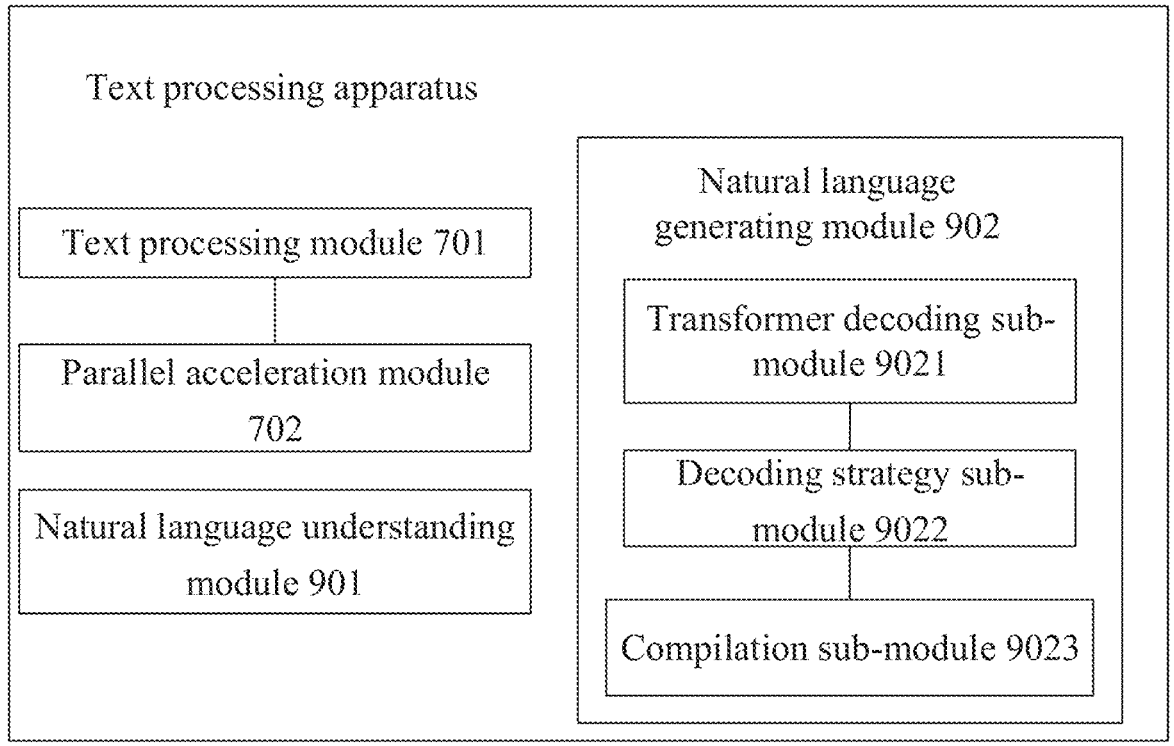
FIG. 9 is a structural schematic diagram of a text processing apparatus according to another embodiment of the present disclosure.

FIG. 9 is a structural schematic diagram of a text processing apparatus according to another embodiment of the present disclosure. The text processing apparatus of this embodiment may include one or more features of the above apparatus embodiments. In one implementation, the apparatus further includes: a natural language understanding module 901 configured to perform natural language understanding processing on the content processed faster by the text processing acceleration operator, by using a natural language understanding model.

In one implementation, the natural language understanding model includes the text processing acceleration operator and a transformer encoder operator.

In one implementation, the transformer encoder operator includes a Fused Attention operator and a Fused Feed forward operator.

In one implementation, the device further includes a natural language generating module 902 configured to perform natural language generating processing on the content processed by the natural language understanding model, by using a natural language generating model.

In one implementation, the natural language generating model includes: a transformer decoder operator and a decoding strategy operator.

In one implementation, the natural language generating module 902 includes: a transformer decoding sub-module 9021 configured to identify a characteristic of a decoder code, by using the transformer decoder operator, to identify an adopted generation network type, and call a preset decoding operator corresponding to the generation network type.

In one implementation, the generation network type includes at least one of: a Decoder type, a Prefix LM type, or an Encoder-Decoder type.

In one implementation, the natural language generating module 902 includes: a decoding strategy sub-module 9022 configured to identify a characteristic of a decoding strategy, by using the decoding strategy operator, to identify an adopted decoding algorithm, and automatically translate a cyclic code running in a first language into a code of a second language, by using the decoding algorithm.

In one implementation, the decoding algorithm includes at least one of: a search-based decoding algorithm, or a sampling-based decoding algorithm.

In one implementation, the natural language generating module 802 further includes: a compilation sub-module 9023 configured to compile the code of the second language, by calling a Just In-time Compiler ability of a deep learning framework, to obtain a dynamic link library, so as to link the dynamic link library with the deep learning framework.

In one implementation, the first language is an interpreted language and the second language is a compiled language.

Figure 10:
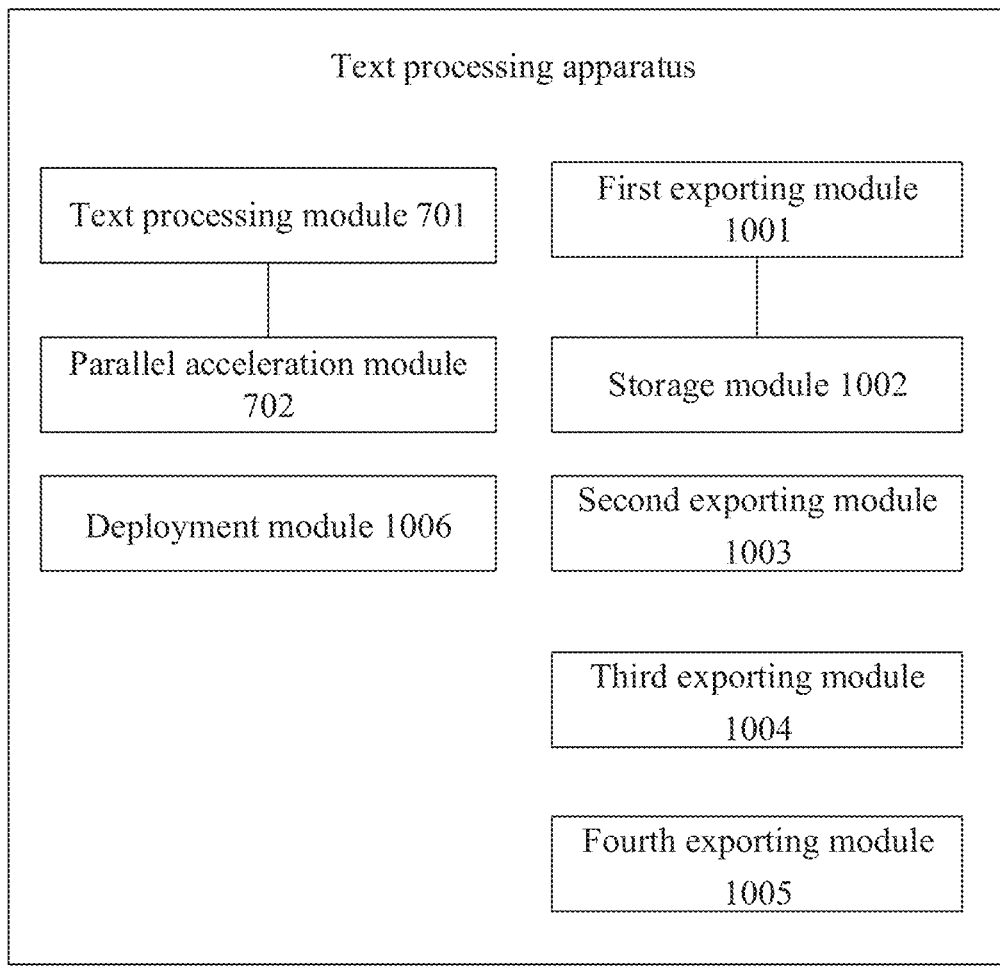
FIG. 10 is a structural schematic diagram of a text processing apparatus according to another embodiment of the present disclosure.

FIG. 10 is a structural schematic diagram of a text processing apparatus according to another embodiment of the present disclosure. The text processing apparatus of this embodiment may include one or more features of the above apparatus embodiments. In one implementation, the apparatus further includes: a first exporting module 1001 configured to export a word-list of the text processing acceleration operator.

In one implementation, the apparatus further includes: a storage module 1002 configured to execute at least one of: storing the exported word-list, in a form of binary serialization; or compressing and storing the exported word-list, by using a compression algorithm.

In one implementation, the apparatus further includes a second exporting module 1003 configured to combine the text processing acceleration operator and a transformer encoder operator into one operator, to export a calculation diagram of the natural language understanding model.

In one implementation, the apparatus further includes: a third exporting module 1004 configured to generate a framework calculation diagram of cyclic decoding, according to the decoding strategy, embed the transformer decoder operator into the framework calculation diagram of the cyclic decoding, and export a calculation diagram of the natural language generating model.

In one implementation, the apparatus further includes: a fourth exporting module 1005 configured to export a combined calculation diagram of natural language processing, the combined calculation diagram of the natural language processing including a calculation diagram combined by the calculation diagram of the natural language understanding model and the calculation diagram of the natural language generating model.

The calculation diagram of the natural language understanding model includes the text processing acceleration operator and a transformer encoder operator; and the calculation diagram of the natural language generating model includes the transformer decoder operator and the decoding strategy operator.

In one implementation, the apparatus further includes: a deployment module 1006 configured to import at least one of the calculation diagram of the natural language understanding model, the calculation diagram of the natural language generating model, or the combined calculation diagram, into a deep learning framework of a plurality of devices.

The specific functions and examples of each module of the text processing apparatus in the embodiments of the present disclosure can be referred to the relevant descriptions in the above embodiments of the text processing method, and will not be repeated herein.

Figure 11:
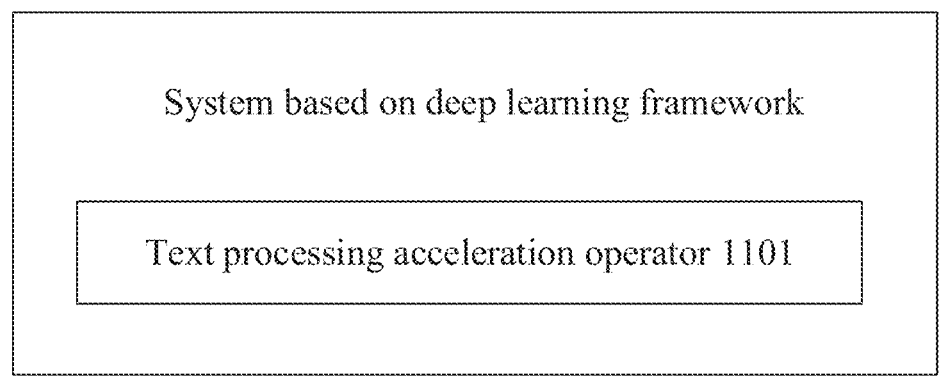
FIG. 11 is a structural schematic diagram of a system based on a deep learning framework according to an embodiment of the present disclosure.

FIG. 11 is a structural schematic diagram of a system based on a deep learning framework according to an embodiment of the present disclosure. The system includes: a text processing acceleration operator 1101 configured to perform text processing on first text and process, in parallel and faster, content after the text processing.

In the embodiments of the present disclosure, the speed of text processing can be improved by the text processing acceleration operator for text processing and parallel acceleration processing.

Figure 12:
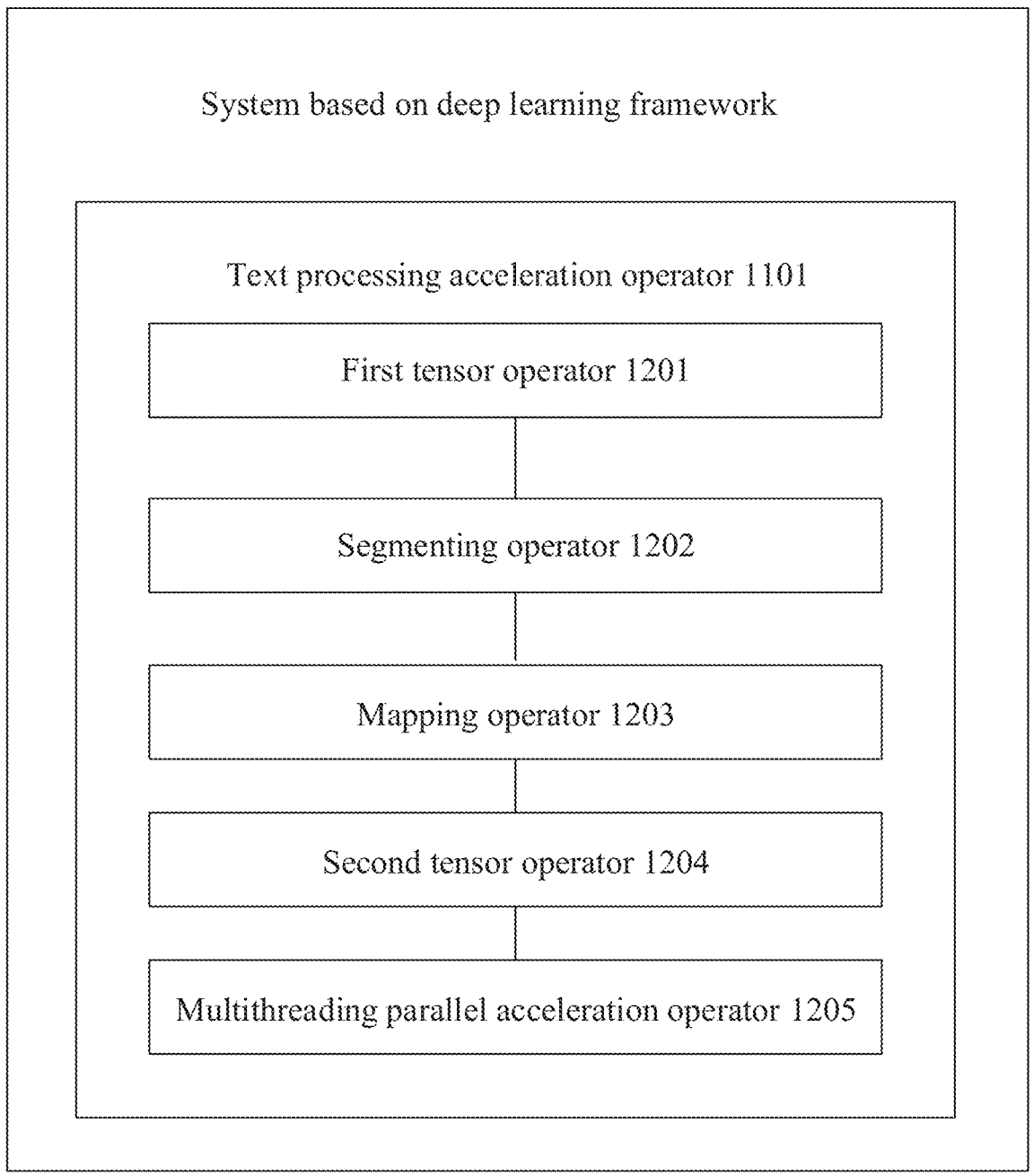
FIG. 12 is a structural schematic diagram of a system based on a deep learning framework according to another embodiment of the present disclosure.

FIG. 12 is a structural schematic diagram of a system based on a deep learning framework according to another embodiment of the present disclosure. The system based on the deep learning framework of this embodiment may include one or more features described in the above embodiments of the system. In one implementation, the text processing acceleration operator 1101 includes the followings.

A first tensor operator 1201 is configured to obtain a first tensor corresponding to the first text.

A segmenting operator 1202 is configured to segment the first tensor, to obtain a plurality of segmentation results.

A mapping operator 1203 is configured to perform identifier mapping on each of the plurality of segmentation results.

A second tensor operator 1204 is configured to generate a second tensor, by using a mapping result.

In one implementation, the segmenting operator 1202 is specifically configured to perform at least one of: performing word segmentation processing on the first tensor, to obtain a plurality of segmented words; and performing term segmentation processing on the first tensor, to obtain a plurality of segmented terms.

In one implementation, the mapping operator 1203 is specifically configured to map each segmented word and/or segmented term to a numerical value, according to a mapping relationship.

In one implementation, the second tensor operator 1204 is specifically configured to obtain each line of numeric value of the second tensor, according to a result of mapping of a corresponding line of string of the first tensor. The first tensor includes N lines of string, the second tensor includes N lines of numeric value corresponding to the N lines of string, and N is a positive integer.

In one implementation, the first text includes a string, and the first tensor is a string tensor. The second tensor is an integer tensor, and each line of numeric value of the second tensor uniquely corresponds to one line of string of the first tensor.

In one implementation, the text processing acceleration operator 1101 further includes a multithreading parallel acceleration operator 1205 configured to process, in parallel, the second tensor, by using multiple threads.

In one implementation, the first tensor operator, the segmenting operator, the mapping operator and the second tensor operator run in the first language, and the multithreading parallel acceleration operator runs in the second language.

Figure 13:
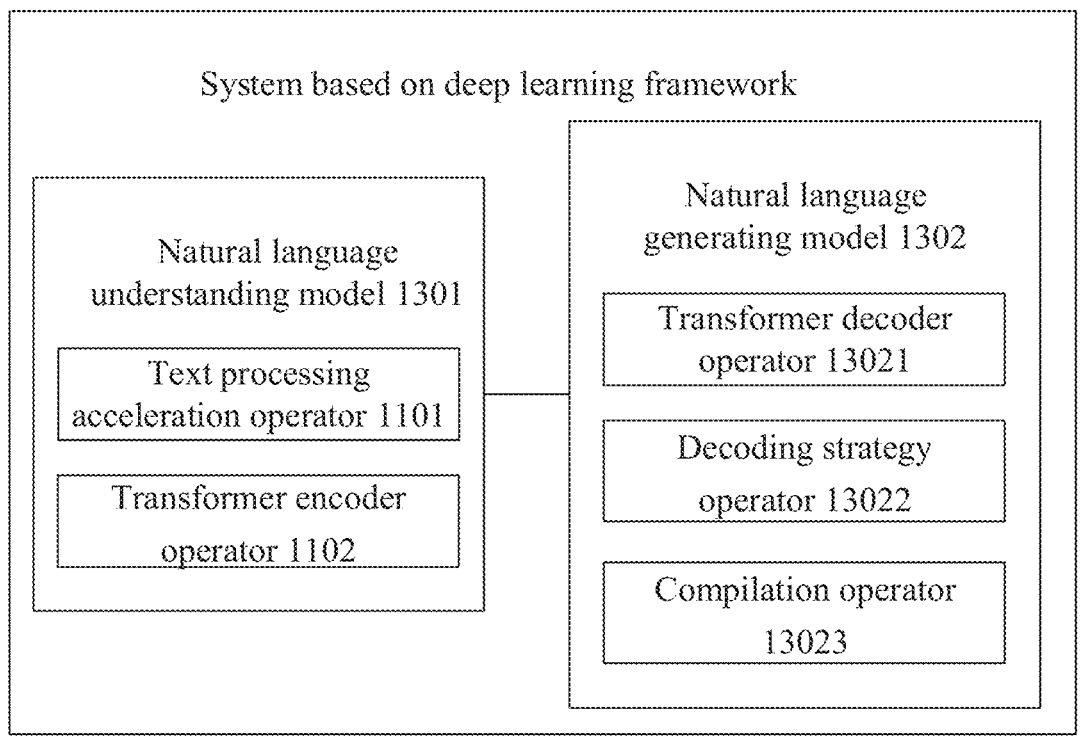
FIG. 13 is a structural schematic diagram of a system based on a deep learning framework according to another embodiment of the present disclosure.

FIG. 13 is a structural schematic diagram of a system based on a deep learning framework according to another embodiment of the present disclosure. The system based on the deep learning framework of this embodiment may include one or more features described in the above embodiments of the system. In one implementation, the system further includes a natural language understanding model 1301 configured to perform natural language understanding processing on the content processed faster by the text processing acceleration operator.

In one implementation, the natural language understanding model includes the text processing acceleration operator 1101 and a transformer encoder operator 1102.

In one implementation, the transformer encoder operator 1102 includes a Fused Attention operator and a Fused Feed forward operator.

In one implementation, the system further includes a natural language generating model 1302 configured to perform natural language generating processing on the content processed by the natural language understanding model.

In one implementation, the natural language generating model 1302 includes a transformer decoder operator 13021 and a decoding strategy operator 13022.

In one implementation, the transformer decoder operator 13021 is configured to: identify a characteristic of a decoder code, by using the transformer decoder operator, to identify an adopted generation network type, and call a preset decoding operator corresponding to the generation network type.

In one implementation, the generation network type includes at least one of: a Decoder type, a Prefix LM type, or an Encoder-Decoder type.

In one implementation, the decoding strategy operator 13022 is configured to: identify a characteristic of a decoding strategy, by using the decoding strategy operator, to identify an adopted decoding algorithm, and automatically translate a cyclic code running in a first language into a code of a second language, by using the decoding algorithm.

In one implementation, the decoding algorithm includes at least one of: a search-based decoding algorithm, or a sampling-based decoding algorithm.

In one implementation, the natural language generating model further includes a compilation operator 13023 configured to compile the code of the second language, by calling a Just In-time Compiler ability of a deep learning framework, to obtain a dynamic link library, so as to link the dynamic link library with the deep learning framework.

In one implementation, the first language is an interpreted language and the second language is a compiled language.

Figure 14:
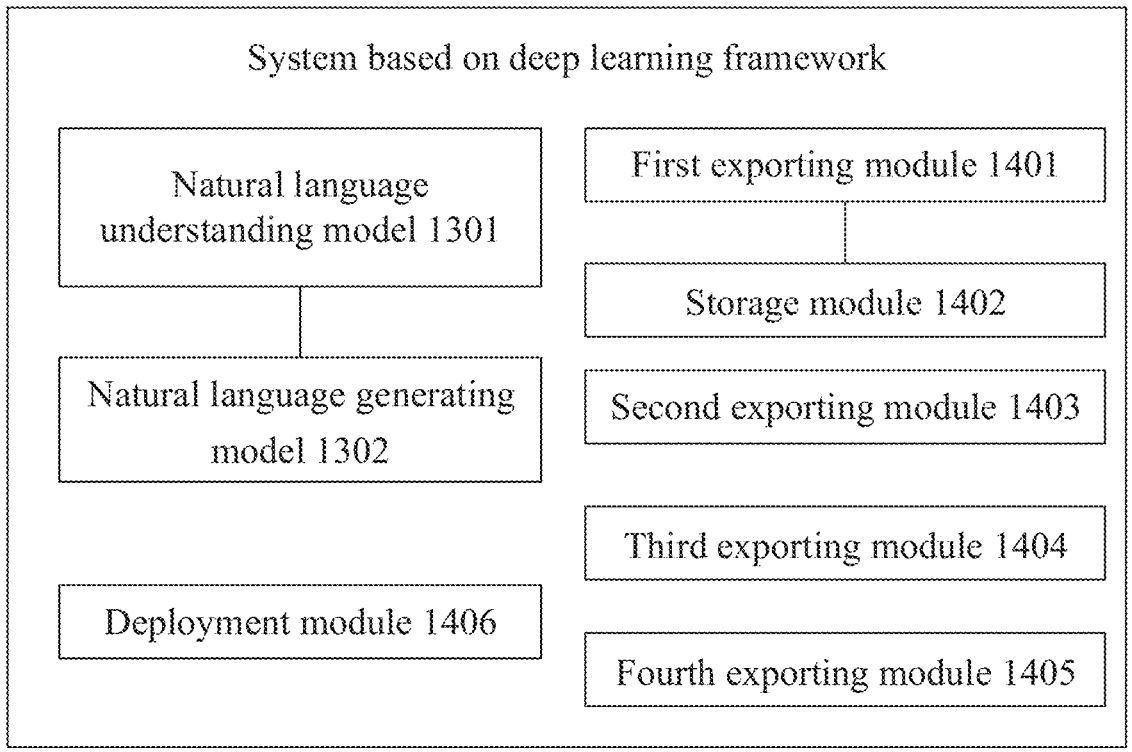
FIG. 14 is a structural schematic diagram of a system based on a deep learning framework according to another embodiment of the present disclosure.

FIG. 14 is a structural schematic diagram of a system based on a deep learning framework according to another embodiment of the present disclosure. The system based on the deep learning framework of this embodiment may include one or more features described in the above embodiments of the system. In one implementation, the system further includes a first exporting module 1401 configured to export a word-list of the text processing acceleration operator.

In one implementation, the system further includes a storage module 1402 configured to execute at least one of: storing the exported word-list, in a form of binary serialization; or compressing and storing the exported word-list, by using a compression algorithm.

In one implementation, the system further includes a second exporting module 1403 configured to combine the text processing acceleration operator and a transformer encoder operator into one operator, to export a calculation diagram of the natural language understanding model.

In one implementation, the system further includes: a third exporting module 1404 configured to generate a framework calculation diagram of cyclic decoding, according to a decoding strategy, embed a transformer decoder operator into the framework calculation diagram of the cyclic decoding, and export a calculation diagram of the natural language generating model.

In one implementation, the system further includes: a fourth exporting module 1405 configured to export a combined calculation diagram of natural language processing, the combined calculation diagram of the natural language processing including a calculation diagram combined by the calculation diagram of the natural language understanding model and the calculation diagram of the natural language generating model.

The calculation diagram of the natural language understanding model includes the text processing acceleration operator and a transformer encoder operator; and the calculation diagram of the natural language generating model includes a transformer decoder operator and a decoding strategy operator.

In one implementation, the system further includes: a deployment module 1406 configured to import, at least one of the calculation diagram of the natural language understanding model, the calculation diagram of the natural language generating model, or the combined calculation diagram, into a deep learning framework of a plurality of devices.

The specific functions and examples of each operator and/or module of the system based on the deep learning framework of the embodiments of the present disclosure can be referred to the relevant descriptions in the above embodiments of the text processing method, and will not be repeated herein.

At present, when the deep learning framework solves the application of pre-training model in NLP scenarios, there is still much room for optimization of training and reasoning performance, and the development experience is inconsistent in training and deployment, which also increases the cost of landing and deployment in real industrial scenarios.

The deep learning framework, such as PyTorch, uses an interpreted language (such as Python) outside the framework for processing, and focuses on high-performance computing of the deep learning model, such as a DNN (Deep Neural Networks) model, a transformer model, an ERNIE (Paddle semantic understanding framework) model, and a BERT (BiDirectional Encoder Representation From Transformers). However, for industrial scenarios such as Internet companies, which pursue extreme performance and cost, a compiled language (such as C++) will be used to develop and implement the model end-to-end, when the model needs to be deployed online. At this point, the C++ end needs to be used to implement the logic of the text processing part. However, if the deep learning framework only performs C++ reasoning on pre-training models (such as DNN/Transformer/BERT/ERNIE), developers need to rewrite a set of C++ versions against Python's complex text processing logic, and strictly align and test them. However, with the migration of models and application scenarios, the process of text processing will change significantly (for example, when moving from text classification to machine translation, the two sets of text processing logic are completely different). At this time, the development cost will be very high and it is easy to encounter detailed problems such as coding, resulting in errors or misalignments in the online deployment effect. For example, the text processing module with reference to the training and reasoning of the BERT model, uses the pure Python version of processing, has no C++ version, and is separated from the TensorFlow framework.

Since the implementation logic of text processing (i.e., the Tokenizer part) of some frameworks is complex and the development cost is high, most of them are implemented in interpreted languages (such as Python), and thus their implementation performance is relatively low. Further, restricted by interpretive languages, it is difficult to speed up processing through multithreading concurrency. For this reason, the embodiments of the present disclosure propose a process of an automatic text processing operator, which can provide, within the framework, a text processing operator for the pre-training model, and can use a compiled language to realize multithreading concurrent acceleration.

For the natural language generating model, due to the complexity of the decoding strategy, the decoding cycle of most of the frameworks is carried out in the interpreted language, and thus, a large amount of framework scheduling overhead is generated, resulting in low GPU utilization and slow text generation. Therefore, the embodiments of the present disclosure propose acceleration processes such as automatic generation network identification, decoding strategy identification, compiled code generation, and Just In-time compilation.

NLP of other frameworks has complicated industrial deployment processes and high costs. Therefore, the embodiments of the present disclosure aiming at the export and deployment of NLP model, can fuse the text processing operator part with the calculation diagram and export the fusion result, and propose a process including text processing, natural language understanding and the joint export of generated calculation diagram, so as to reduce the deployment cost.

In the embodiments of the present disclosure, a method and system based on a deep learning framework, such as Baidu Paddle Deep Learning Framework, are provided, which can satisfy the efficient development, training and reasoning of the two key application scenarios of natural language understanding and generating. The scheme of the embodiments of the present disclosure can be widely applied to a variety of landing scenarios of natural language processing industrialization, such as text classification, sequence annotation, machine translation, text generation, reading comprehension, general dialogue, etc.

According to the application characteristics of natural language processing in the deep learning framework, the embodiments of the disclosure propose the following application process, including at least one of: the operationalization of the end-to-end text processing, the joint acceleration of natural language understanding model and generating model, and the deployment scheme of the integration of training and reasoning.

1. Operationalization of End-to-End Text Processing in Deep Learning Framework.

In view of the fact that the whole deep learning framework can use tensors to speed up processing, a set of tensor expressions for raw text types is provided. This approach can automatically fuse low-performance processes implemented in the interpreted language (such as the Python) and automatically generate corresponding high-performance C++ code, through the string tensor protocol combined with the code generation (Code Gen) principle of compiler technology. Through the automatic parallelization of the high-performance acceleration library of the central processing unit (CPU), such as MKLDNN (Math Kernel Library for Deep Neural Networks), the code implementation speed is nearly 100 times faster than that of the traditional interpreted code (such as Python). Illustratively, the above described low-performance processes may include functions of a plurality of complex text processing processes, such as a basic term segmentation module, an identifier (ID) mapping module and other fine-grained modules.

Figure 15:
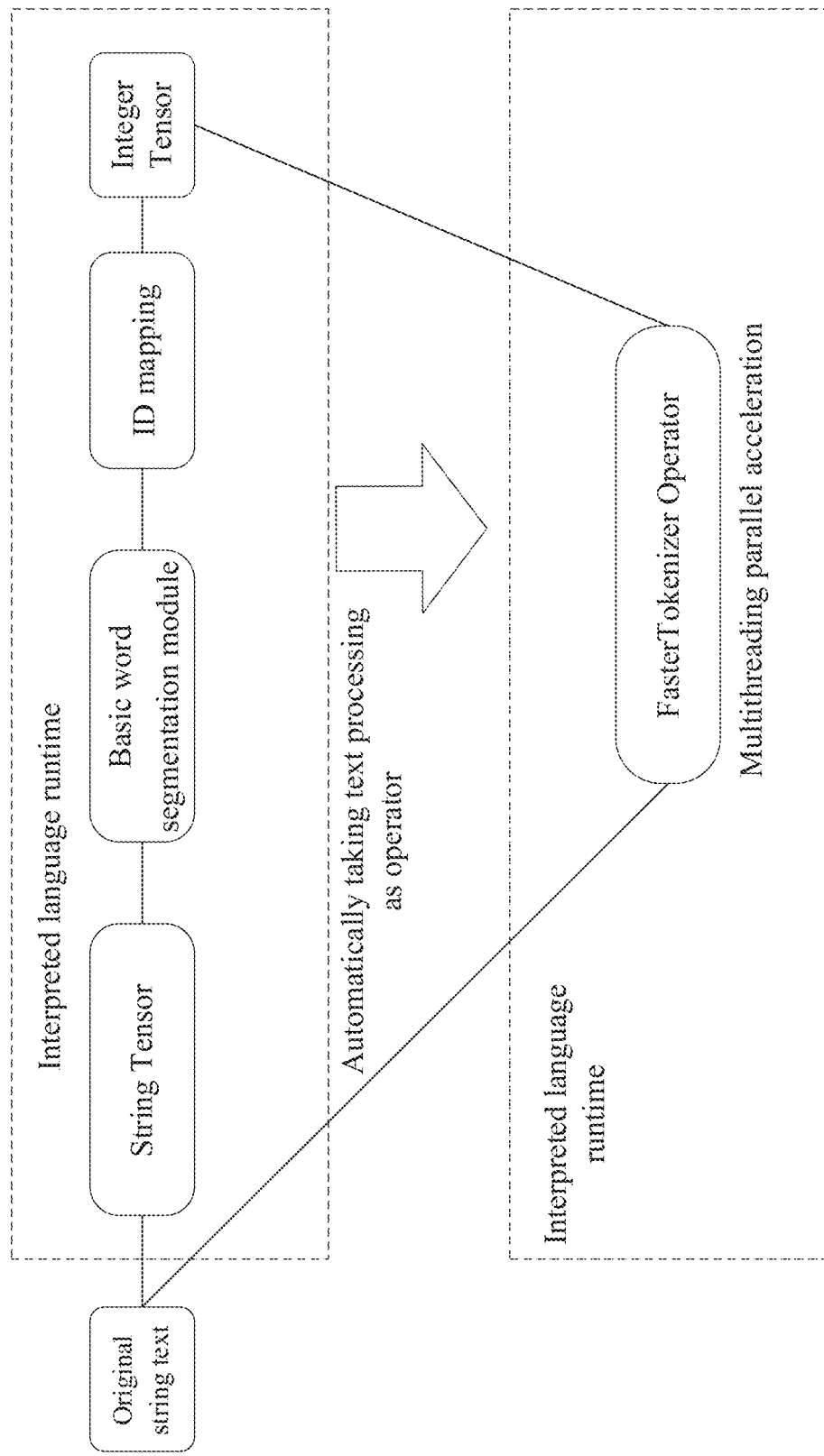
FIG. 15 is a schematic flowchart of operationalization of end-to-end text processing.

As shown in FIG. 15, it is a process of the operationalization of the end-to-end text processing of deep learning, which can automatically operationalize the text processing, and then accelerate the text processing in parallel through multithreading. For example, in the automatic operationalization of the text processing, a string tensor operator converts an original string text into a string tensor firstly, and a segmenting operator performs word segmentation on the string tensor by using a basic word segmentation module. Then, a mapping operator performs ID mapping on each word segmentation result, to obtain an integer numerical value corresponding to each word segmentation result, and then an integer tensor operator uses the normal value corresponding to the original string to obtain an integer tensor. Through multithreading, the integer tensor can be processed in parallel. The process of the automatic operationalization of the text processing can realize the above-mentioned text processing and parallel acceleration through, for example, the Faster Tokenizer Operator, in which the basic text processing function implemented by the interpreted language is converted into that implemented by the compiled language. By using the characteristic of that the compiled language can be used for multithreading parallel processing, the speed of text processing can be improved greatly. The Faster Tokenizer Operator may also be called as a faster segmenting operator, an accelerated tokenizer, or a tokenizer, etc.

2. Automatic Acceleration Process of the Task of Natural Language Understanding and Generating.

The type of natural language understanding models is mainly the type of encoder based on a transformer model (which may be referred to as a transformer encoder for short).

Figure 16:
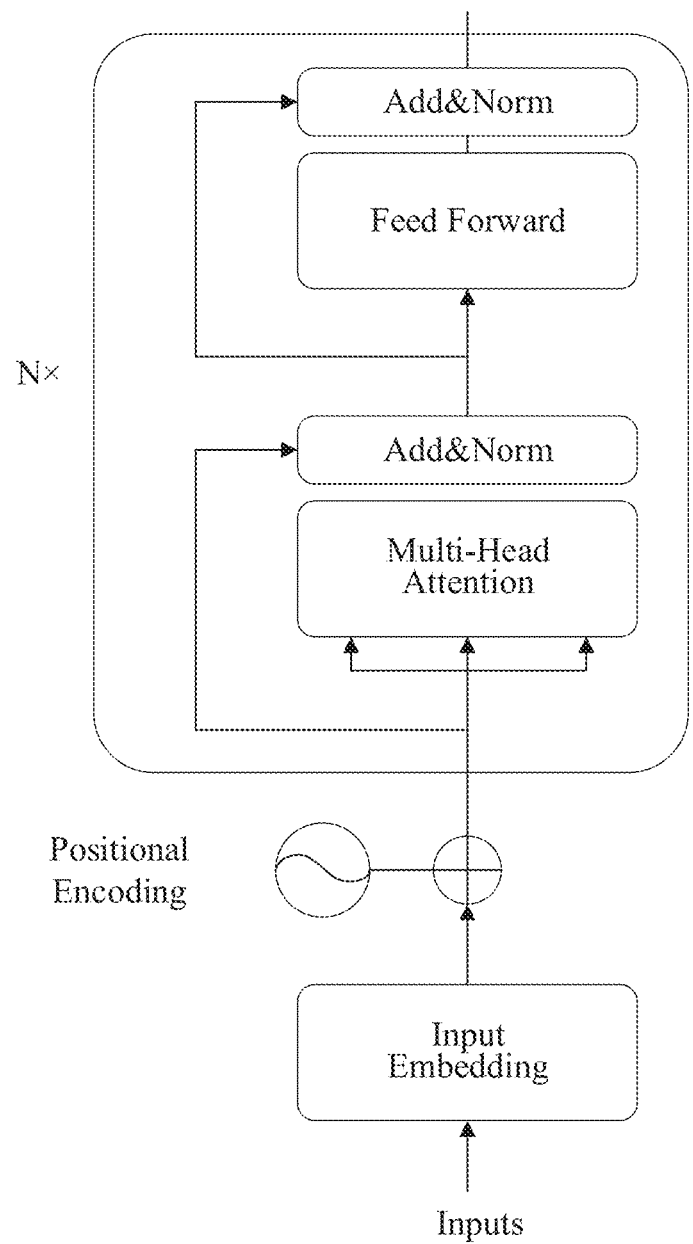
FIG. 16 is a structural schematic diagram of an exemplary transformer encoder operator.

As shown in FIG. 16, it is a structural schematic diagram of an exemplary transformer encoder. The transformer encoder may include an Add&Norm and a feed forward.

Illustratively, the type of natural language generating model, according to an encoder type, may include the followings.

Figure 17A:
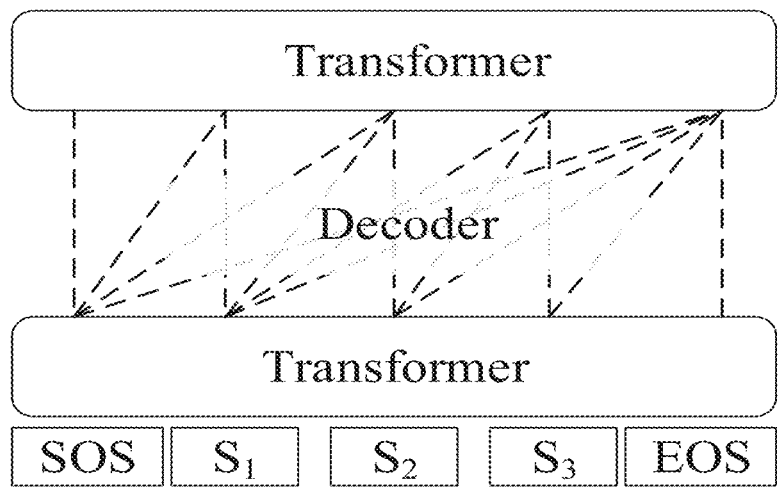
FIG. 17a is a schematic diagram of a generation network of a decoder type.

A pure decoder type. As shown in FIG. 17*a*, the natural language generating model of the pure decoder type may include a transformer layer, a decoder layer and a transformer layer. The representative model structure of the pure decoder type may be, for example, a Generate Pre-Training (GPT) model.

Figure 17B:
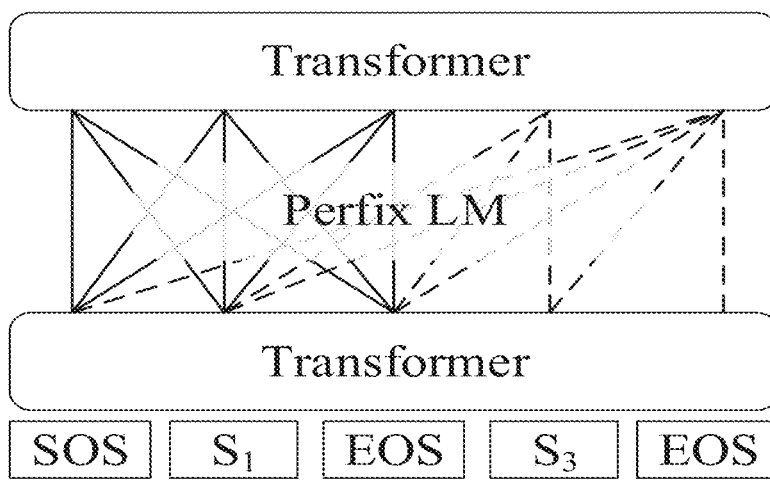
FIG. 17b is a schematic diagram of a generation network of a Prefix Language Model (Prefix LM) type.

A Prefix Language Model (Prefix LM) type. As shown in FIG. 17*b*, the natural language generating model of the pure Prefix LM type may include a transformer layer, a Prefix LM layer and a transformer layer. The representative model of the Prefix LM type may be, for example, a Unified Language Model (UniLM), and/or a PLATO model (a pre-training model for general domain dialog generation).

Figure 17C:
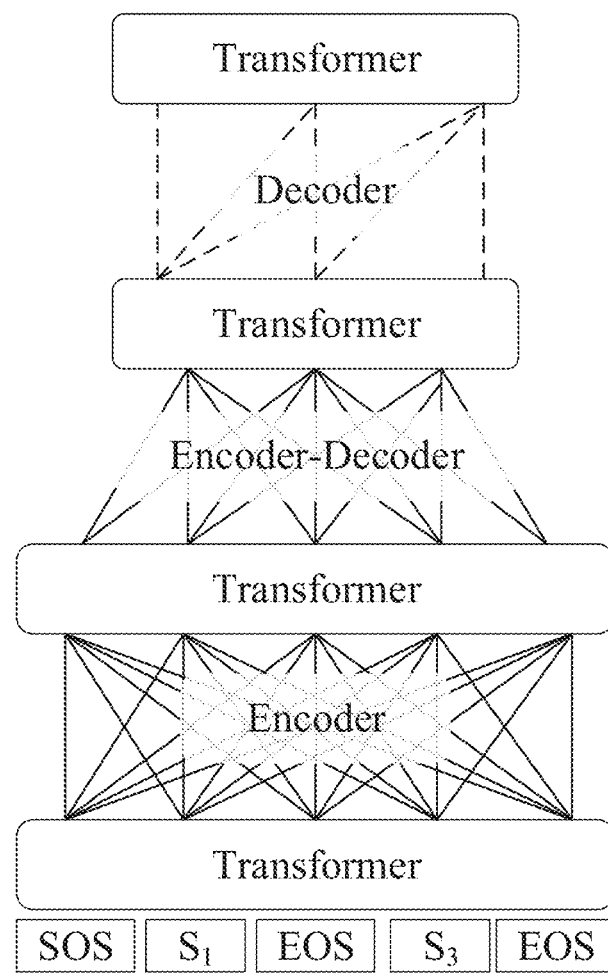
FIG. 17c is a schematic diagram of a generation network of an Encoder-Decoder type.

An Encoder-Decoder type. As shown in FIG. 17*c*, the natural language generating model of the Encoder-Decoder type may include a transformer layer, a decoder layer, a transformer layer, an encoder-decoder layer, a transformer layer, an encoder layer and a transformer layer. The representative model of the Encoder-Decoder type may be, for example, a BART (Bidirectional and Auto-Regressive Transformers) model.

Illustratively, the generated decoding strategy may include the following types.

Figure 18A:
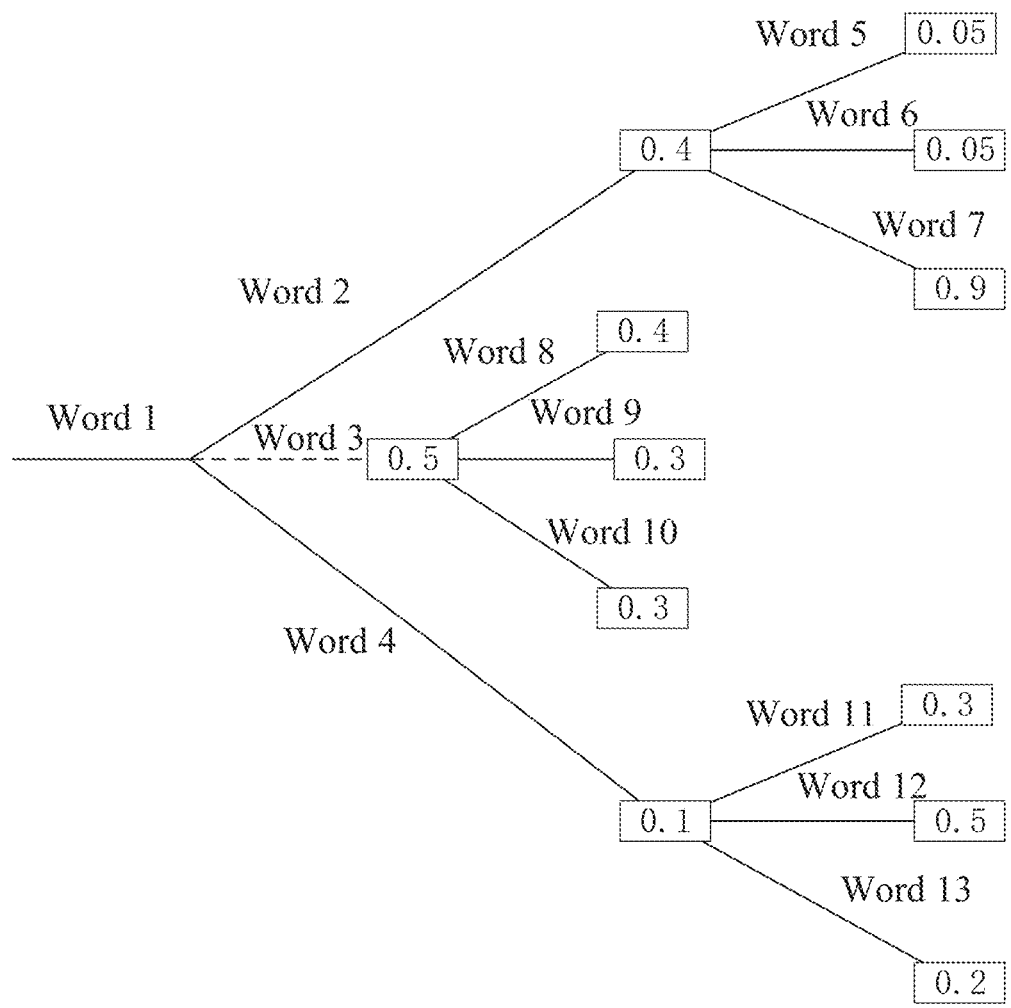
FIG. 18a is a schematic diagram of that the decoding strategy is a beam search.

A search-based decoding algorithm, such as a beam search, a greedy search, a diverse sibling search, and so on. As shown in FIG. 18*a*, it is an example of the beam search. A given syntax sentence inputted to the encoder/decoder is used to output the most likely probability value of the first word firstly, for example, the probability value of word 1 to word 2 is 0.4, the probability value of word 1 to word 3 is 0.5, and the probability value of word 1 to word 4 is 0.1. Then, it is considered that what the second word is for each first possible word that has been selected. For example, the probability values of word 2 to word 5, to word 6, and to word 7 are 0.05, 0.05, and 0.9 respectively; the probability values of word 3 to word 8, to word 9, and to word 20 are 0.4, 0.4, and 0.3 respectively; and the probability values of word 4 to word 11, to word 12, and to word 13 are 0.3, 0.5, and 0.2 respectively.

Figure 18B:
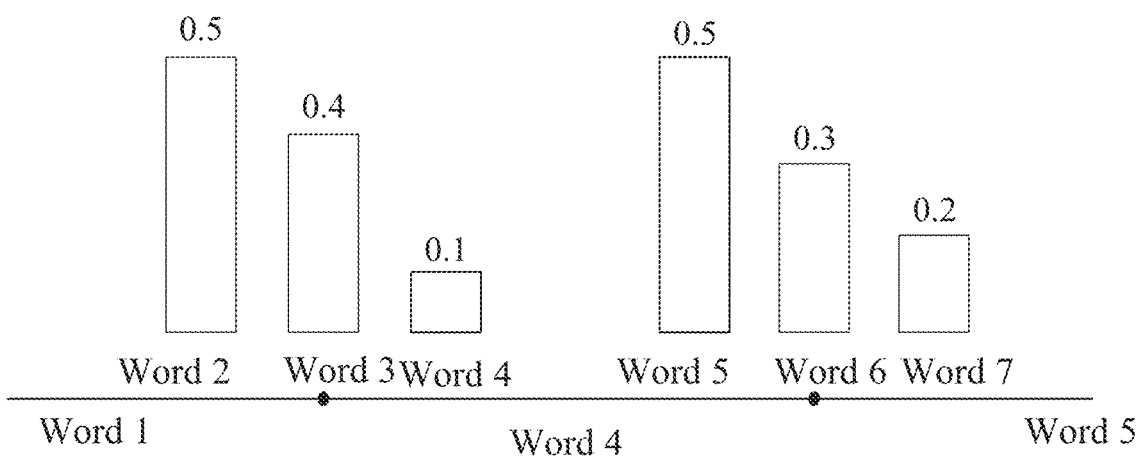
FIG. 18b is a schematic diagram of that the decoding strategy is a sampling search.

A sampling-based decoding algorithm, such as Top-K Sampling, Top-P Sampling, etc. As shown in FIG. 18*b*, it is an example of a sampling search.

Figure 19:
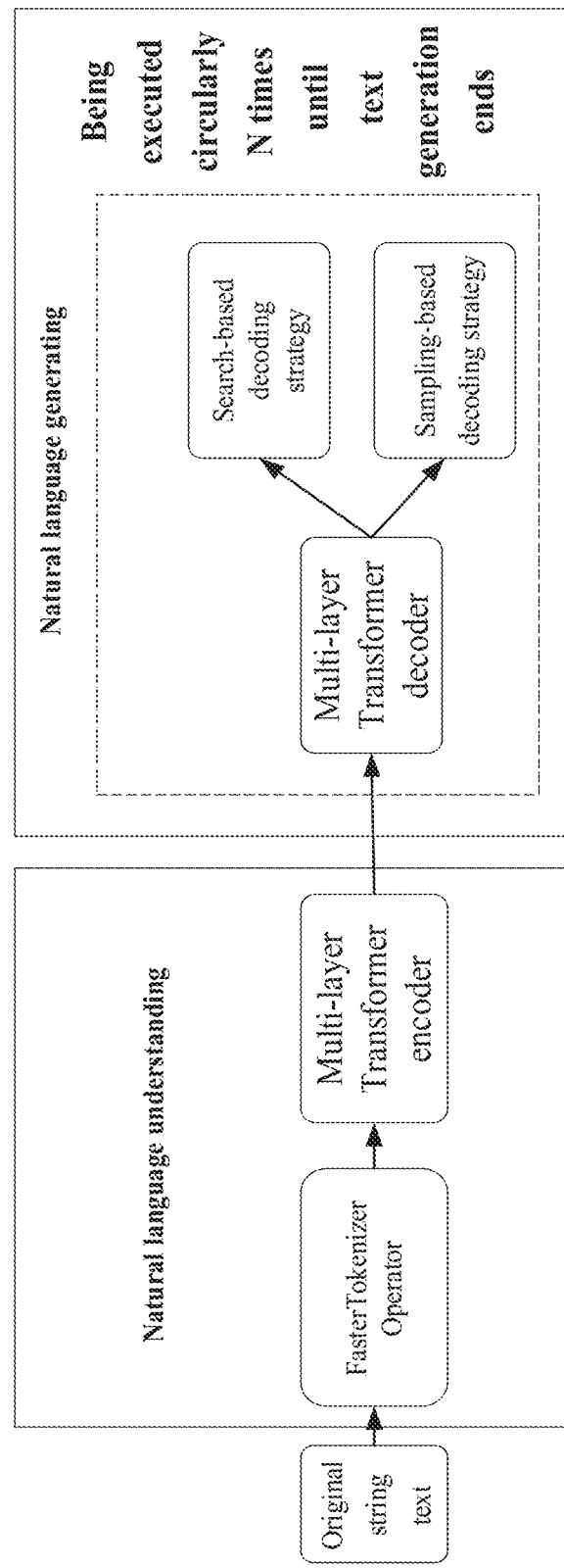
FIG. 19 is a schematic flowchart of joint optimization of deep learning framework understanding and generating models.

In the embodiments of the present disclosure, a comprehensive and accelerated process that combines a natural language understanding model (which may be referred to as an understanding module for short) and a natural language generating model (which may be referred to as a generating module for short) is provided. As shown in FIG. 19, the process may include the following parts.

1) The acceleration optimization of the Transformer encoder in the understanding model, as shown in FIG. 19, may include the following steps.

In S11, for the input of original text such as a string text, the framework may automatically insert a Faster Tokenizer Operator to perform high-performance processing on the original text.

In S12, a multi-layer Transformer encoder is called for string encoding.

Illustratively, for the encoder optimization in the understanding model, a Fused Attention and a Fused Feed forward may be included.

Figure 20A:
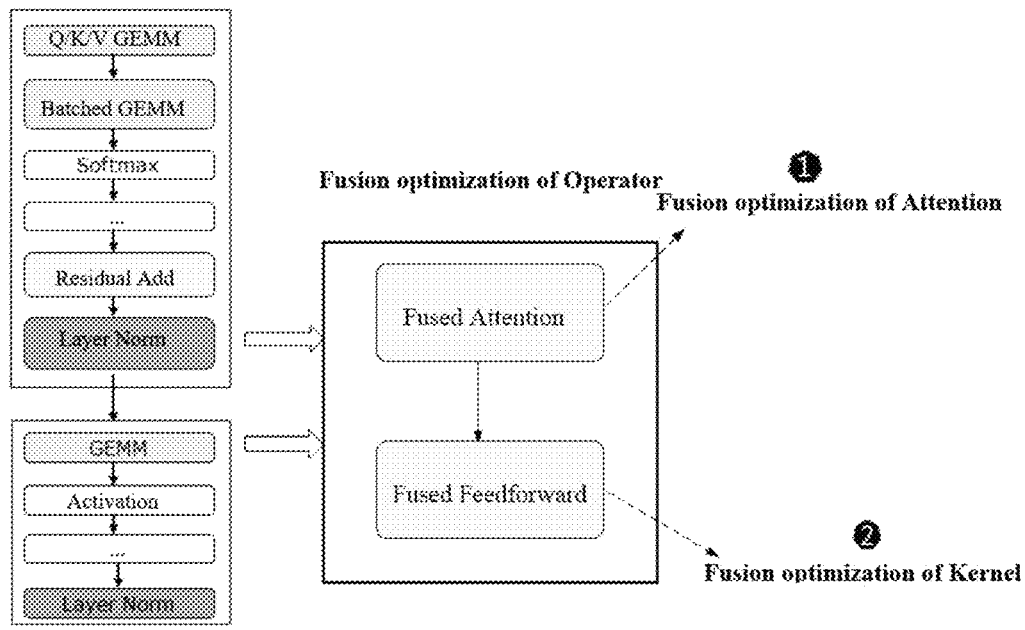
FIG. 20a, FIG. 20b and FIG. 20c are schematic flowcharts of the fusion of a transformer encoder operator.
Figure 20B:
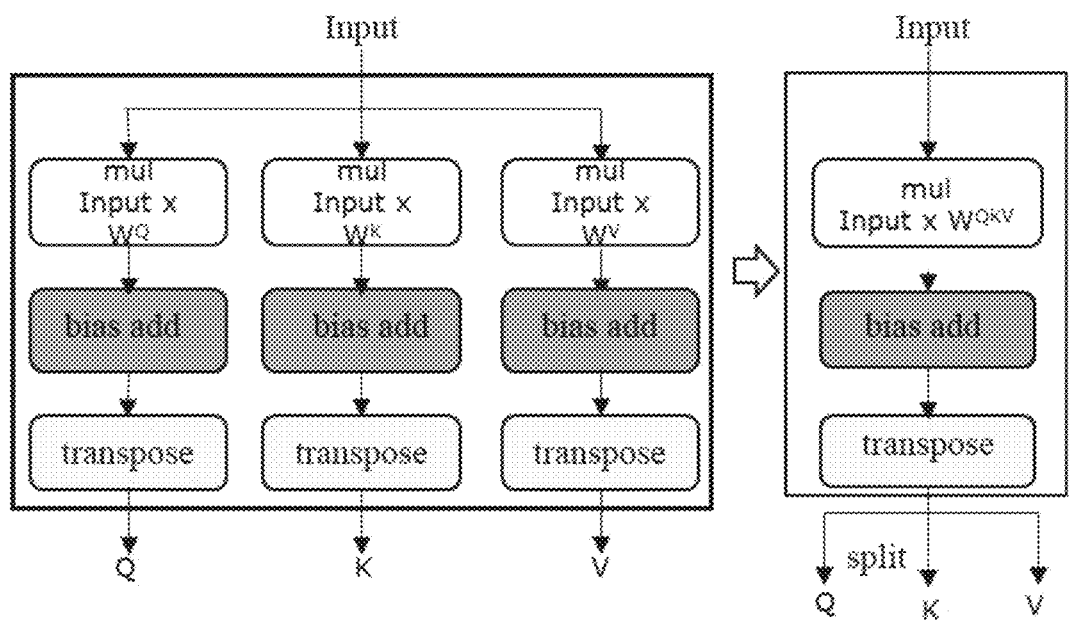
Figure 20C:
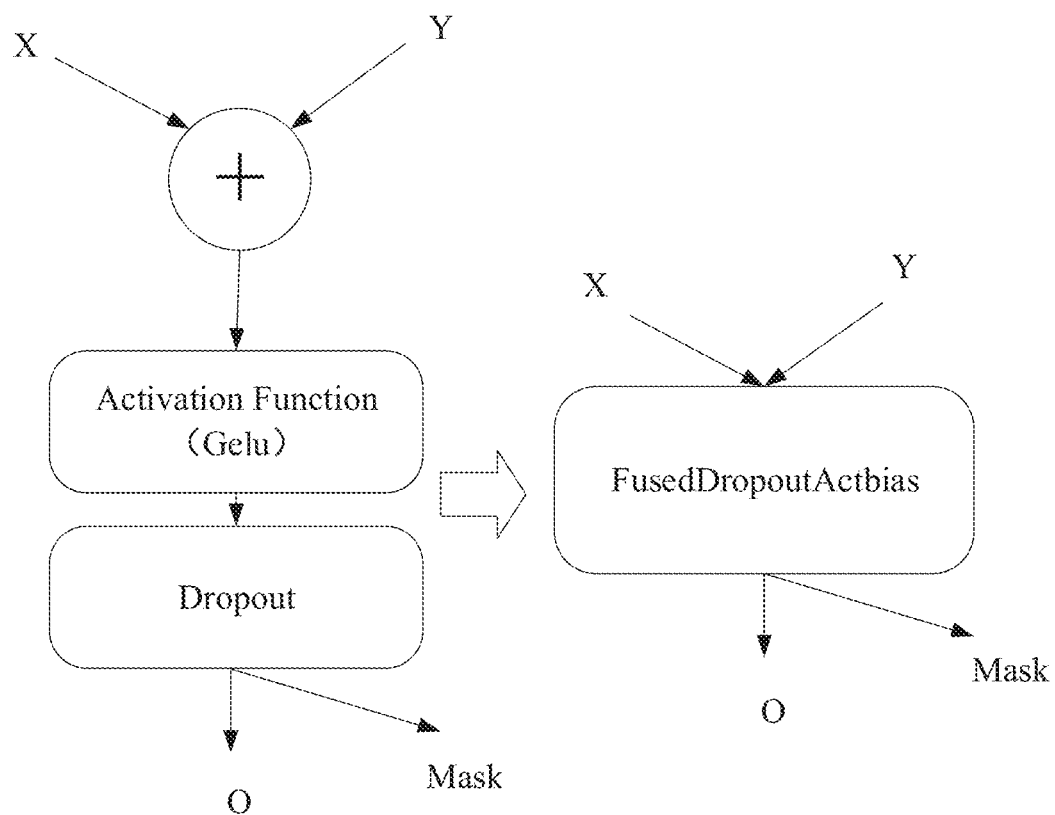

(1) In the encoding process, the fusion optimization may be made for Multi-Head Attention, to reduce the framework scheduling overhead. For example, the quantity of operators may be reduced by ⅓, as shown in FIG. 20*a*, FIG. 20*b* and FIG. 20*c*. The quantity of the GEMM, the bias add, and the transpose, etc., in the Multi-Head Attention may be reduced from 3 to 1, the data reuse rate may be improved, and then the Fused Attention operator is obtained.

(2) The fusion optimization for a Feed forward layer is made. For example, as shown in FIG. 20*c*, the traditional three Kernel operators of the GPU are fused into one, to obtain the Fused Feed forward operator. For example, the Kernel operators to be fused may include the Fused DropoutActBias, the FusedLnAddDropoutBias, the FusedAddDropoutBias, and so on. The overhead of the memory access operation can be reduced by half, for example, reduced from 8 load/store to 4 load/store.

2) For the acceleration optimization of the Transformer decoder in the generating model, see also FIG. 20*a*, FIG. 20*b* and FIG. 20*c*. For example, the process of the acceleration optimization may include the following steps.

In S21, a generation network type is identified and a preset decoding operator is called. Specifically, a multi-layer transformer decoder operator may identify a characteristic of a decoder code of a user and classify the generation network type. For example, according to the types shown in FIG. 17*a*, FIG. 17*b* and FIG. 17*c*, the characteristic of the decoder code of the user may be identified as one of the three generation network types. Then, the preset high-performance decoding operator corresponding to the identified generation network type may be automatically invoked for calculation.

In S22, a decoding strategy is identified, and a compiled language is automatically generated. Specifically, a decoding strategy operator may identify a characteristic of a decoding strategy of the user, and determine whether the decoding strategy of the user is a search-based algorithm or a sampling-based algorithm. According to the difference between the search-based algorithm and the sampling-based algorithm, a circular code in an interpreted language may be automatically translated into a code of a compiled language, to improve the performance.

In S23, the framework automatically compiling in time, and automatically generating and linking with an operator. For example, a Just In-time Compiler ability of the deep learning framework, such as a Paddle framework is called, to obtain a dynamic link library quickly, and the dynamic link library is linked to obtain a high-performance decoding operator.

The process may be executed circularly N times until the text generation ends.

3) The process of the deployment scheme of the integration of training and reasoning of the understanding and generating models may include the following parts.

The first part is the export of the understanding model, which may include the following steps: in S1.1, exporting a word-list in a tokenizer firstly and storing the exported word-list, in a form of binary serialization; in S1.2 (optionally), a series of compression algorithms may also be used to reduce the storage of the word-list file according to the characteristic of the text of the word-list; and next in S1.3, the tokenizer and a multi-layer transformer encoder are combined into an operator, and the operator is exported as an overall calculation diagram of the understanding model.

The second part is the export of the generating model, which may include the following steps: in S2.1, a framework calculation diagram of cyclic decoding (which may be referred to as a cyclic framework calculation diagram for short) is generated firstly, according to a decoding strategy; in S2.2, embedding an operator of a multi-layer transformer decoder into a decoding strategy cycle, i.e., the cyclic framework calculation diagram; and in S2.3 generating a calculation diagram of the generating model.

The third part is the combination of calculation diagrams according to business needs. If only the natural language understanding part is required, only the calculation diagram of the understanding model is needed. If the calculation diagram of the generating model part is needed, the calculation diagram of the understanding model and the calculation diagram of the generating model may be combined into one calculation diagram, to satisfy the requirements of the plurality of devices for integration of training and reasoning and unified deployment.

The scheme of the embodiments of the present disclosure can effectively optimize the speed of training models, the speed of training and deployment cost of the full scene application of natural language understanding, to achieve deployment experience of integration of training and reasoning.

Figure 21A:
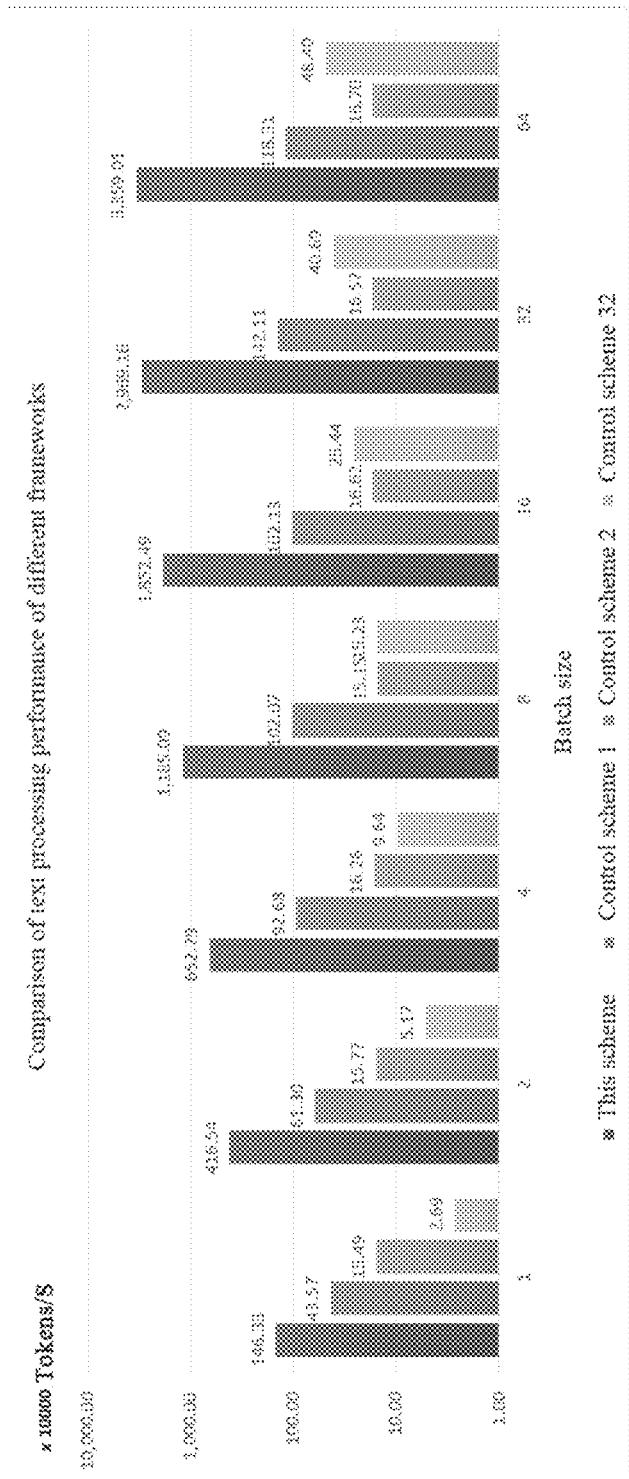
FIG. 21a is an exemplary diagram of comparison of text processing performance of different frames.

As shown in FIG. 21a which is a comparison diagram of text processing performance of different frameworks, through the accelerated segmenting scheme (i.e., this scheme), the speed of text processing can be much faster than that of other frameworks. For example, this scheme may be corresponding to a Paddle Faster Tokenizer. The control scheme 1 may be corresponding to a HuggingFace Tokenizer (Rust), the control scheme 2 may be corresponding to a HuggingFace Tokenizer (Python), and the control scheme 3 may be corresponding to a TensorFlow Text.

Figure 21B:
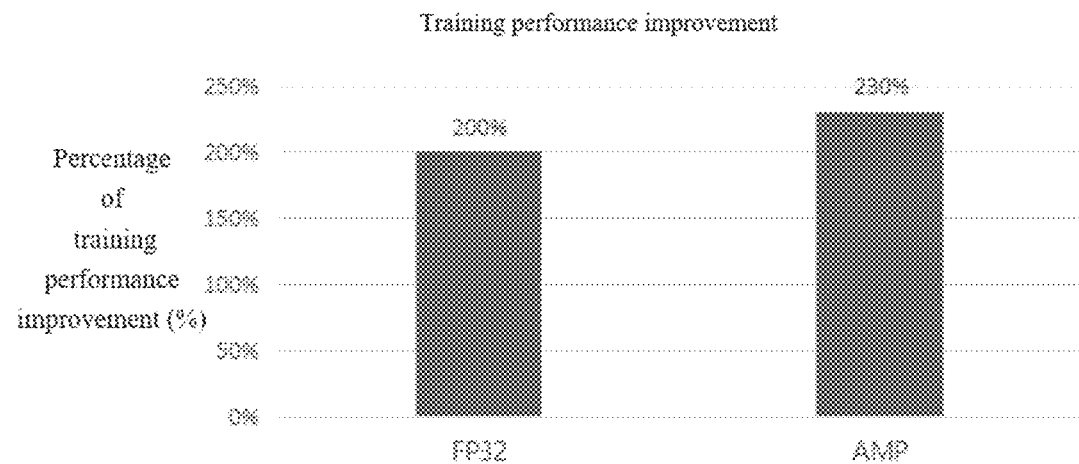
FIG. 21b is an exemplary diagram of an increase in training speed.
Figure 21C:
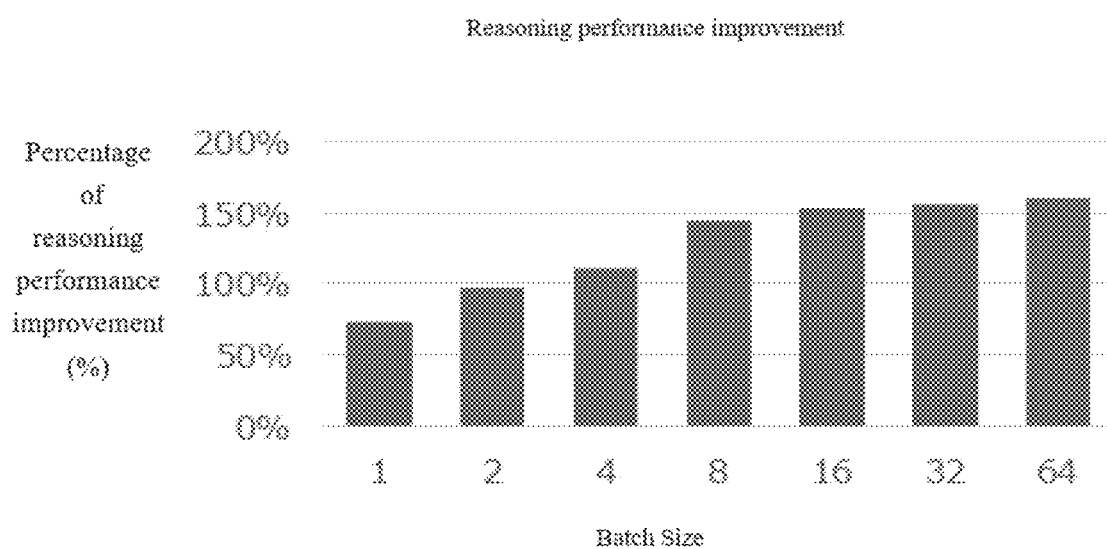
FIG. 21c is an exemplary diagram of an increase in reasoning speed.

The model forward calculation of this scheme supports the input of original text, and the text processing and the model calculation support the export of the whole diagram. Compared with traditional schemes, the training speed of this scheme can be increased by more than 200%, and the reasoning speed can be increased by 160%, as recorded in FIG. 21b and FIG. 21c.

The cost of the simultaneous deployment can be reduced by 94% compared with versions without the integration of training and reasoning. For example, the deploying code of C++ is reduced from more than 800 lines to 48 lines.

Figure 21D:
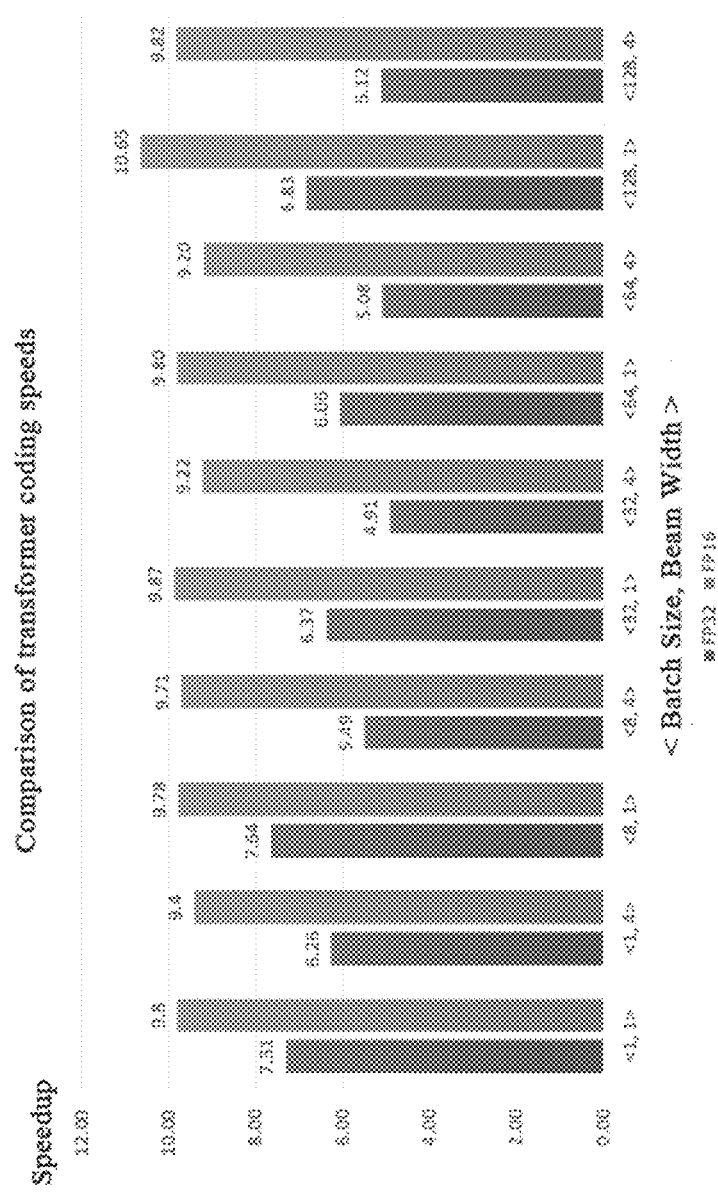
FIG. 21d is an exemplary diagram of comparison of transformer coding speeds.

As shown in FIG. 21d, after applying the fusion optimization strategy of the generating and understanding models of this scheme to the generating task, such as the machine translation, the acceleration ratio can be increased by more than 10 times, compared with the native implementation of similar frameworks such as PyTorch.

The embodiments of the disclosure propose a whole process development paradigm for a deep learning framework in the full application scenario of natural language understanding and natural language generating, which can greatly improve the performance of the model training and reasoning and reduce the deployment cost. Based on the characteristic of the deep learning to tensorize the calculation, the compiled language is automatically generated according to the text processing process of the interpreted language and the ability of parallel acceleration is tensorized. The fusion/joint optimization of operators for calculation diagrams of natural language understanding and generating may reduce the overhead of framework scheduling and memory access, and greatly improve the performance. Calculation diagrams of text processing, natural language understanding and natural language generating are jointly exported, and the entire process is stored in an integrated manner, which forms a unique development experience of integration of training and reasoning for one-time export and deployment-in-multi-place, thereby reducing the deployment cost.

In the technical solution of the present disclosure, the acquisition, storage and application of the user's personal information involved are all in compliance with the provisions of relevant laws and regulations, and do not violate public order and good customs.

According to the embodiments of the present disclosure, the present disclosure also provides an electronic device, a readable storage medium and a computer program product.

Figure 22:
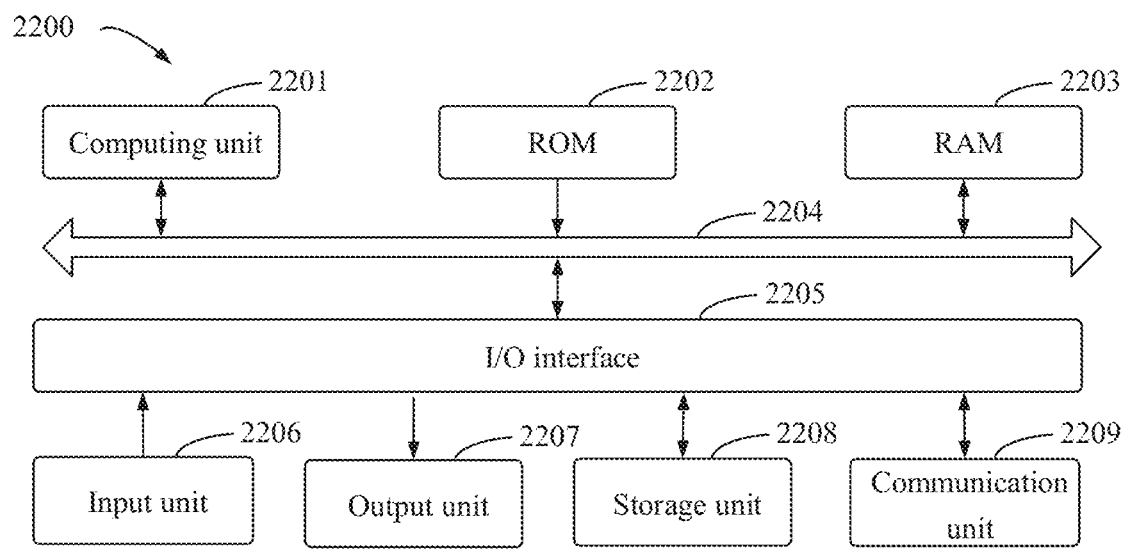
FIG. 22 shows a schematic block diagram of an exemplary electronic device used to implement embodiments of the present disclosure.

FIG. 22 shows a schematic block diagram of an exemplary electronic device 2200 that may be used to implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processing, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 22, the device 2200 includes a computing unit 2201 that may perform various appropriate actions and processes according to a computer program stored in a Read-Only Memory (ROM) 2202 or a computer program loaded from a storage unit 2208 into a Random Access Memory (RAM) 2203. Various programs and data required for an operation of device 2200 may also be stored in the RAM 2203. The computing unit 2201, the ROM 2202 and the RAM 2203 are connected to each other through a bus 2204. The input/output (I/O) interface 2205 is also connected to the bus 2204.

A plurality of components in the device 2200 are connected to the I/O interface 2205, and include an input unit 2206 such as a keyboard, a mouse, or the like; an output unit 2207 such as various types of displays, speakers, or the like; the storage unit 2208 such as a magnetic disk, an optical disk, or the like; and a communication unit 2209 such as a network card, a modem, a wireless communication transceiver, or the like. The communication unit 2209 allows the device 2200 to exchange information/data with other devices through a computer network such as the Internet and/or various telecommunication networks.

The computing unit 2201 may be various general-purpose and/or special-purpose processing components with processing and computing capabilities. Some examples of the computing unit 2201 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 2201 performs various methods and processing described above, such as the above text processing method. For example, in some implementations, the above text processing method may be implemented as a computer software program tangibly contained in a computer-readable medium, such as the storage unit 2208. In some implementations, a part or all of the computer program may be loaded and/or installed on the device 2200 via the ROM 2202 and/or the communication unit 2209. When the computer program is loaded into RAM 2203 and executed by the computing unit 2201, one or more steps of the text processing method described above may be performed. Alternatively, in other implementations, the computing unit 2201 may be configured to perform the above text processing method by any other suitable means (e.g., by means of firmware).

Various implements of the system and technologies described above herein may be implemented in a digital electronic circuit system, an integrated circuit system, a Field Programmable Gate Array (FPGA), an Application Specific Integrated Circuit (ASIC), Application Specific Standard Parts (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a blockchain server.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the spirit and principle of the present disclosure shall be included in the protection scope of the present disclosure.

What is claimed is:

1. A text processing method, comprising:
performing text processing on first text, by using a text processing acceleration operator, comprising:
obtaining a first tensor corresponding to the first text;
segmenting the first tensor, to obtain a plurality of segmentation results;
performing identifier mapping on each of the plurality of segmentation results; and
generating a second tensor, by using a mapping result; and performing parallel acceleration processing on, content after the text processing, by using the text processing acceleration operator, comprising:
processing, in parallel, the second tensor, by using multiple threads.

2. The method of claim 1, wherein segmenting the first tensor, to obtain the plurality of segmentation results, comprises at least one of:
performing word segmentation processing on the first tensor, to obtain a plurality of segmented words; and
performing term segmentation processing on the first tensor, to obtain a plurality of segmented terms.

3. The method of claim 2, wherein performing the identifier mapping on each of the plurality of segmentation results, comprises:
mapping each segmented word and/or each segmented term to a numeric value, according to a mapping relationship.

4. The method of claim 1, wherein generating the second tensor by using the mapping result, comprises:
obtaining each line of numeric value of the second tensor, according to a result of mapping of a corresponding line of string of the first tensor, the first tensor comprising N lines of string, the second tensor comprising N lines of numeric value corresponding to the N lines of string, and N being a positive integer.

5. The method of claim 1, wherein the first text comprises a string, and the first tensor is a string tensor; and the second tensor is an integer tensor, and each line of numeric value of the second tensor uniquely corresponds to one line of string of the first tensor.

6. The method of claim 1, wherein the text processing is transformed from being executed in a first language into being executed in a second language.

7. The method of claim 6, wherein the first language is an interpreted language and the second language is a compiled language.

8. The method of claim 1, further comprising:
performing natural language understanding processing on content after the parallel acceleration processing by using a natural language understanding model.

9. The method of claim 8, wherein the natural language understanding model comprises the text processing acceleration operator and a transformer encoder operator.

10. The method of claim 9, wherein the transformer encoder operator comprises a Fused Attention operator and a Fused Feed forward operator.

11. The method of claim 1, further comprising:
performing natural language generating processing on content processed by the natural language understanding model, by using a natural language generating model.

12. The method of claim 11, wherein the natural language generating model comprises a transformer decoder operator and a decoding strategy operator.

13. The method of claim 12, wherein performing the natural language generating processing on the content processed by the natural language understanding model, by using the natural language generating model, comprises:
identifying a characteristic of a decoder code, by using the transformer decoder operator, to identify an adopted generation network type; and
calling a preset decoding operator corresponding to the generation network type.

14. The method of claim 13, wherein the generation network type comprises at least one of:
a Decoder type;
a Prefix Language Model (Prefix LM) type; or
an Encoder-Decoder type.

15. The method of claim 12, wherein performing the natural language generating processing on the content processed by the natural language understanding model, by using the natural language generating model, further comprises:
identifying a characteristic of a decoding strategy, by using the decoding strategy operator, to identify an adopted decoding algorithm; and
automatically translating a cyclic code running in a first language into a code of a second language, by using the decoding algorithm.

16. The method of claim 15, wherein the decoding algorithm comprises at least one of:
a search-based decoding algorithm; or
a sampling-based decoding algorithm.

17. The method of claim 15, wherein performing the natural language generating processing on the content processed by the natural language understanding model, by using the natural language generating model, further comprises:
compiling the code of the second language, by calling a Just In-time Compiler ability of a deep learning framework, to obtain a dynamic link library, so as to link the dynamic link library with the deep learning framework.

18. The method of claim 15, wherein the first language is an interpreted language and the second language is a compiled language.

19. The method of claim 1, further comprising:
exporting a word-list of the text processing acceleration operator.

20. The method of claim 19, further comprising at least one of:
storing the exported word-list, in a form of binary serialization; and
compressing and storing the exported word-list, by using a compression algorithm.

21. The method of claim 1, further comprising:
combining the text processing acceleration operator and a transformer encoder operator into one operator, to export a calculation diagram of a natural language understanding model.

22. The method of claim 1, further comprising:
generating a framework calculation diagram of cyclic decoding, according to a decoding strategy;
embedding a transformer decoder operator into the framework calculation diagram of the cyclic decoding; and
exporting a calculation diagram of a natural language generating model.

23. The method of claim 1, further comprising:
exporting a combined calculation diagram of natural language processing, the combined calculation diagram of the natural language processing comprising a calculation diagram combined by a calculation diagram of a natural language understanding model and a calculation diagram of a natural language generating model;
wherein the calculation diagram of the natural language understanding model comprises the text processing acceleration operator and a transformer encoder operator; and the calculation diagram of the natural language generating model comprises a transformer decoder operator and a decoding strategy operator.

24. The method of claim 1, further comprising:
importing, at least one of a calculation diagram of a natural language understanding model, a calculation diagram of a natural language generating model, or a combined calculation diagram, into a deep learning framework of a plurality of devices.

25. An electronic device, comprising:
at least one processor; and
a memory connected in communication with the at least one processor;
wherein the memory stores an instruction executable by the at least one processor, and the instruction, when executed by the at least one processor, enables the at least one processor to execute the method of claim 1.

26. A non-transitory computer-readable storage medium storing a computer instruction thereon, wherein the computer instruction is used to cause a computer to execute the method of claim 1.

* * * * *